(12) United States Patent
Coulter

(10) Patent No.: US 11,110,848 B2
(45) Date of Patent: Sep. 7, 2021

(54) TRAILER AND HOUSING SYSTEM

(71) Applicant: Jason Coulter, Camdenton, MO (US)

(72) Inventor: Jason Coulter, Camdenton, MO (US)

( * ) Notice: Subject to any disclaimer, the term of this patent is extended or adjusted under 35 U.S.C. 154(b) by 114 days.

(21) Appl. No.: 16/530,302

(22) Filed: Aug. 2, 2019

(65) Prior Publication Data

US 2019/0351807 A1 Nov. 21, 2019

Related U.S. Application Data

(63) Continuation of application No. 15/485,927, filed on Apr. 12, 2017, now Pat. No. 10,414,322.

(60) Provisional application No. 62/321,450, filed on Apr. 12, 2016.

(51) Int. Cl.
| | | |
|---|---|---|
| *B60P 3/34* | (2006.01) | |
| *B62D 33/02* | (2006.01) | |
| *B62D 63/06* | (2006.01) | |
| *B62D 29/04* | (2006.01) | |

(52) U.S. Cl.
CPC .............. *B60P 3/34* (2013.01); *B62D 29/048* (2013.01); *B62D 33/0207* (2013.01); *B62D 63/061* (2013.01); *B62D 63/062* (2013.01)

(58) Field of Classification Search
CPC .......... B60P 3/34; B60P 3/38; B62D 33/0207; B62D 63/061; B62D 63/062
USPC ........................... 296/164, 167, 26.04–26.07
See application file for complete search history.

(56) References Cited

U.S. PATENT DOCUMENTS

| | | |
|---|---|---|
| 2,155,582 A | 4/1939 | Bond |
| 2,193,352 A | 3/1940 | Thomas |
| 2,995,397 A | 8/1961 | Eames |
| 3,368,839 A | 2/1968 | Stewart |
| 3,462,123 A | 8/1969 | Oliver |
| 3,490,807 A | 1/1970 | Sare |
| 3,560,043 A | 2/1971 | Harter |
| 3,608,954 A | 9/1971 | Lynd |
| 3,622,193 A | 11/1971 | Schmidt |
| 3,885,826 A | 5/1975 | Kropf |
| 4,220,370 A * | 9/1980 | Rice .......................... B60P 3/34 296/165 |
| 4,239,430 A | 12/1980 | Groene |
| 4,261,614 A | 4/1981 | Rice |
| 4,262,956 A | 4/1981 | Kellam |
| 4,648,649 A | 3/1987 | Beal |
| 5,011,216 A | 4/1991 | Baughman |
| 5,016,858 A | 5/1991 | Mitchell |

(Continued)

OTHER PUBLICATIONS

Office Action (Restriction) dated Oct. 18, 2018 in corresponding U.S. Appl. No. 15/485,927, filed Apr. 12, 2017, 6 pages.

(Continued)

*Primary Examiner* — Gregory A Blankenship

(74) *Attorney, Agent, or Firm* — Hovey Williams LLP

(57) ABSTRACT

A housing and trailer system comprising a trailer and a housing. The housing includes a lower housing and an upper housing and may be positioned on friction-reducing members that reduce friction between the housing and trailer. The reduction of friction facilitates the housing to slide more efficiently on the trailer. A safety lever and linkage system operates to safely move roof support structures and raise/lower the upper housing. An adjustable cargo system is attached to a roof on the housing. The adjustable cargo system is adjustable to receive and/or secure different sizes of cargo.

17 Claims, 24 Drawing Sheets

(56) References Cited

U.S. PATENT DOCUMENTS

| | | | |
|---|---|---|---|
| 5,052,739 A | 10/1991 | Irwin | |
| 5,102,179 A | 4/1992 | Royer | |
| 5,129,697 A | 7/1992 | Heikkinen | |
| 5,374,094 A | 12/1994 | Smith et al. | |
| 5,735,565 A | 4/1998 | Papai et al. | |
| 5,735,566 A | 4/1998 | Bradley | |
| 5,799,962 A | 9/1998 | Barnhart | |
| 5,927,782 A | 7/1999 | Olms | |
| 6,059,159 A | 5/2000 | Fisher | |
| 6,186,571 B1 | 2/2001 | Burke | |
| 6,286,891 B1 | 9/2001 | Gage et al. | |
| 6,302,475 B1 * | 10/2001 | Anderson | B60P 3/34 296/175 |
| 6,325,447 B1 | 12/2001 | Kuo | |
| 6,460,653 B1 * | 10/2002 | Hardy | A01M 31/02 182/63.1 |
| 6,644,704 B1 | 11/2003 | Nyberg | |
| 6,712,414 B2 | 3/2004 | Morrow | |
| 6,840,569 B1 * | 1/2005 | Leigh | B60P 3/34 296/173 |
| 6,971,563 B2 | 12/2005 | Levi | |
| 7,090,286 B1 | 8/2006 | Foreth et al. | |
| 7,178,848 B1 | 2/2007 | Mather et al. | |
| 7,296,836 B1 | 11/2007 | Sabo | |
| 7,464,977 B1 | 12/2008 | Price | |
| 7,591,497 B2 | 9/2009 | Johns | |
| 7,753,615 B1 | 7/2010 | Sprague | |
| 7,815,015 B2 | 10/2010 | Kerns | |
| 8,016,172 B1 | 9/2011 | Mefford | |
| 8,141,931 B1 | 3/2012 | Santisi | |
| 8,267,455 B1 | 9/2012 | Ludwick | |
| 8,474,767 B1 | 7/2013 | Nicholls | |
| 9,630,666 B1 | 4/2017 | Keene et al. | |
| 10,414,322 B1 | 9/2019 | Coulter | |
| 10,618,449 B2 | 4/2020 | Steury et al. | |
| 2002/0125736 A1 * | 9/2002 | Messano | B60P 3/34 296/165 |
| 2002/0190534 A1 | 12/2002 | Armstrong | |
| 2003/0000769 A1 * | 1/2003 | Pyle | E06C 1/39 182/63.1 |
| 2004/0026945 A1 | 2/2004 | Kench, III et al. | |
| 2004/0164578 A1 * | 8/2004 | Mack | B60N 2/3015 296/26.04 |
| 2005/0194807 A1 | 9/2005 | Gonzales | |
| 2005/0236856 A1 * | 10/2005 | Steury | B60P 3/34 296/26.04 |
| 2007/0210598 A1 * | 9/2007 | Lozano | B60P 3/34 296/26.05 |
| 2008/0079277 A1 | 4/2008 | Wethington | |
| 2009/0001756 A1 | 1/2009 | Dempsey et al. | |
| 2009/0189403 A1 | 7/2009 | Voglmayr | |
| 2009/0205880 A1 * | 8/2009 | Hammonds | B62D 33/063 180/6.48 |
| 2010/0072237 A1 | 3/2010 | Green | |
| 2011/0101719 A1 | 5/2011 | James et al. | |
| 2011/0209418 A1 | 9/2011 | Drake | |
| 2012/0150394 A1 * | 6/2012 | Schwindaman | B60P 3/34 701/49 |
| 2013/0008931 A1 | 1/2013 | Wang | |
| 2013/0009420 A1 * | 1/2013 | Ackermann | F41H 5/20 296/26.05 |
| 2013/0049398 A1 * | 2/2013 | Park | B60P 3/341 296/171 |
| 2013/0062900 A1 | 3/2013 | Bullard | |
| 2013/0229025 A1 | 9/2013 | Johnasen | |
| 2013/0305625 A1 | 11/2013 | Pike et al. | |
| 2014/0183893 A1 | 7/2014 | Scarbrough et al. | |
| 2014/0265248 A1 | 9/2014 | Ravencroft et al. | |
| 2015/0145279 A1 | 5/2015 | Eickhoff | |
| 2015/0321716 A1 | 11/2015 | Patterson et al. | |
| 2016/0090234 A1 * | 3/2016 | Ronstadt | B60J 5/08 414/802 |
| 2016/0288690 A1 | 10/2016 | Wills | |
| 2018/0273121 A1 | 9/2018 | Kennedy | |
| 2018/0361904 A1 | 12/2018 | Huntimer | |
| 2018/0363318 A1 * | 12/2018 | Johnson | E04H 15/44 |
| 2019/0106045 A1 | 4/2019 | Patterson et al. | |
| 2019/0256007 A1 | 8/2019 | Mansour et al. | |
| 2019/0344700 A1 | 11/2019 | Steury et al. | |
| 2019/0351806 A1 * | 11/2019 | Coulter | B62D 63/064 |
| 2020/0131796 A1 | 4/2020 | Currid | |
| 2020/0139873 A1 | 5/2020 | McGregor et al. | |
| 2020/0148090 A1 | 5/2020 | Coulter | |
| 2020/0148126 A1 | 5/2020 | Griffith et al. | |
| 2020/0240133 A1 * | 7/2020 | Miacolo | E06B 9/34 |
| 2020/0346700 A1 | 11/2020 | Nordstrom | |
| 2020/0391650 A1 | 12/2020 | Leishman et al. | |
| 2020/0406997 A1 | 12/2020 | Vandergon et al. | |
| 2021/0155165 A1 | 5/2021 | Larsson et al. | |

OTHER PUBLICATIONS

Office Action dated Feb. 15, 2019 in corresponding U.S. Appl. No. 15/485,927, filed Apr. 12, 2017, 7 pages.

Office Action dated Dec. 17, 2020 in co-pending U.S. Appl. No. 16/530,225, 14 pages.

Office Action dated Feb. 9, 2021 in co-pending U.S. Appl. No. 16/530,379, 16 pages.

Office Action dated Mar. 12, 2021 in co-pending U.S. Appl. No. 16/532,984, 17 pages.

Office Action dated Jul. 21, 2021 in co-pending U.S. Appl. No. 16/739,404, filed Jan. 10, 2020, 26 pages.

* cited by examiner

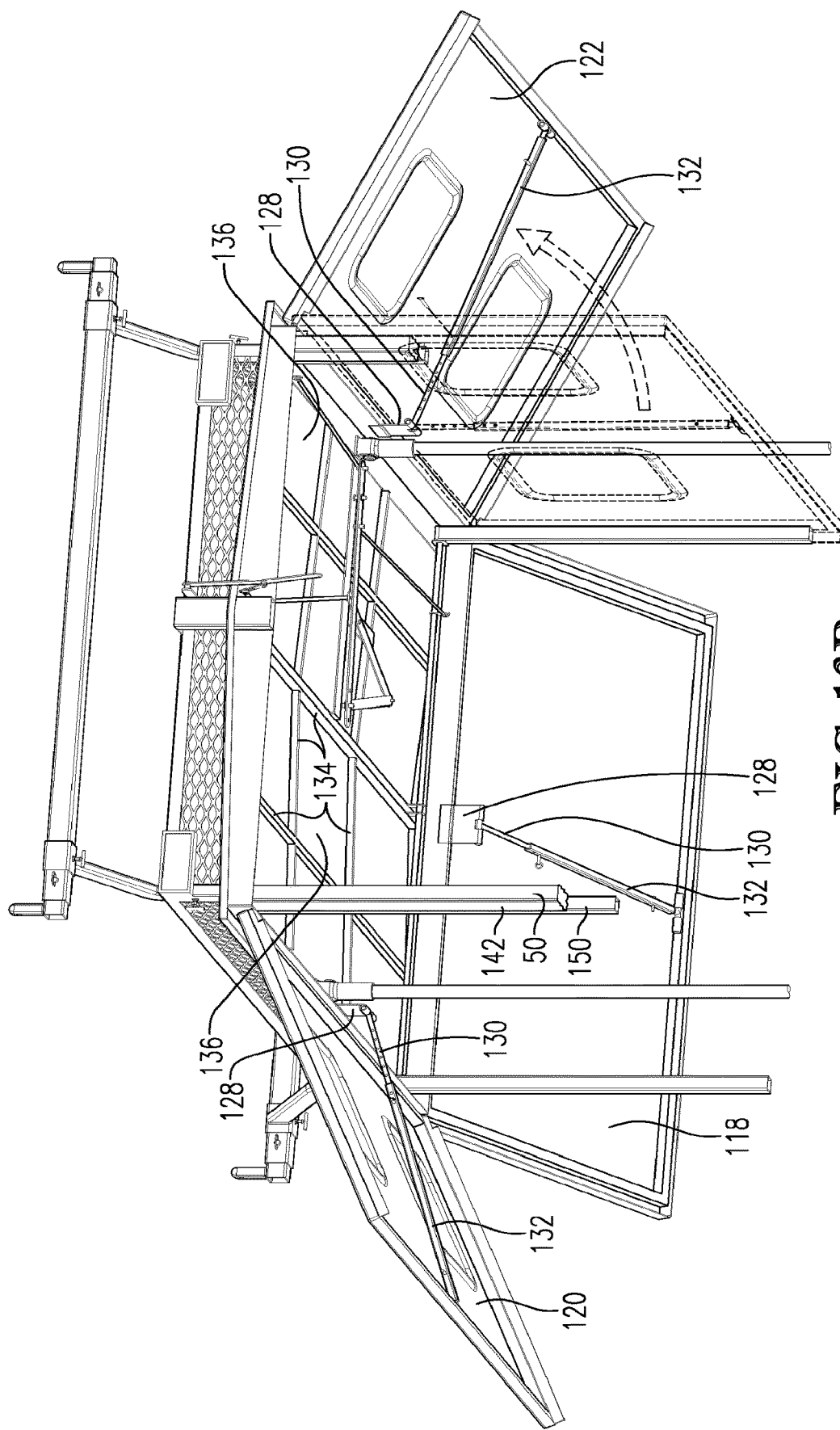

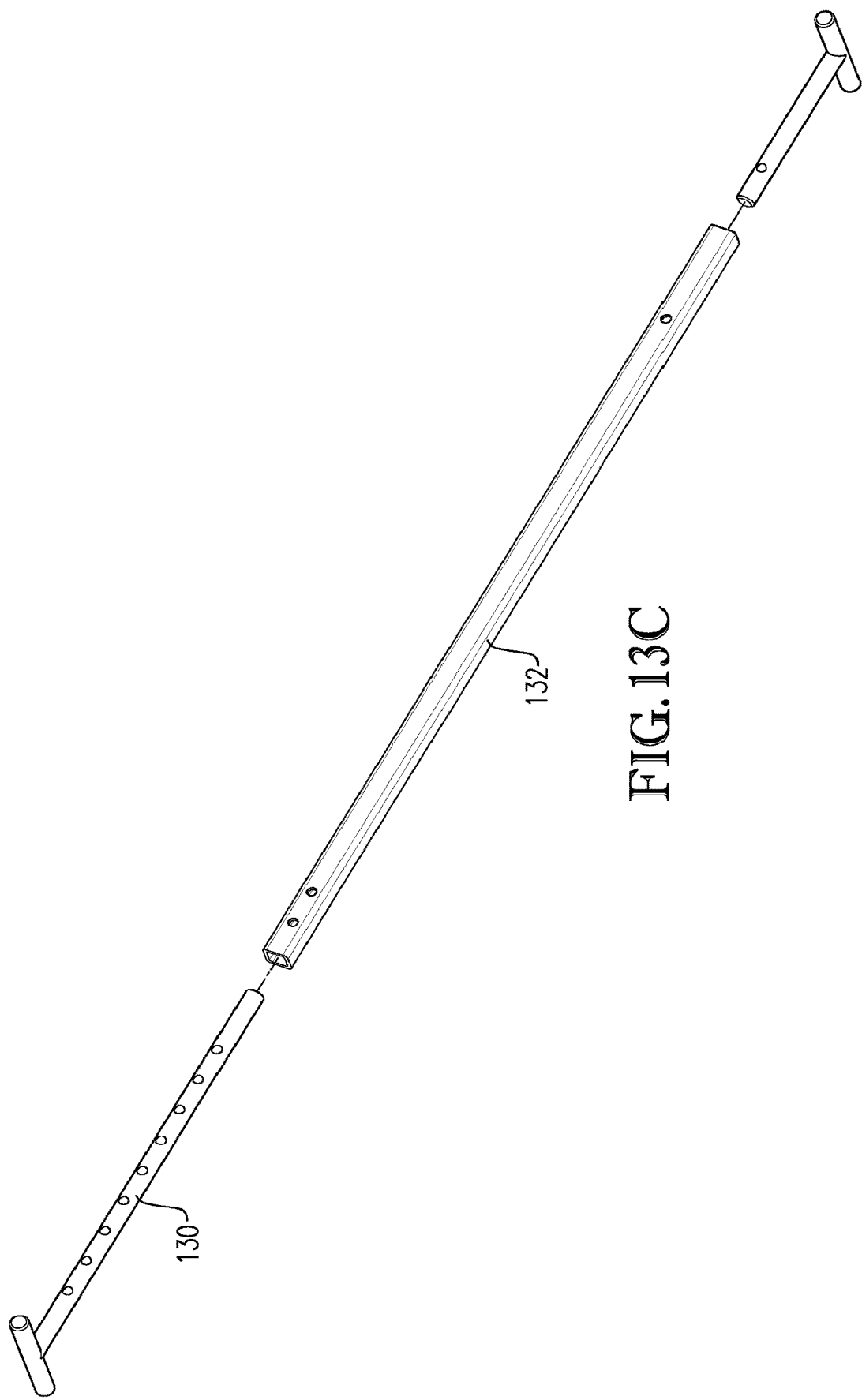

TRAILER AND HOUSING SYSTEM

RELATED APPLICATIONS

The present non-provisional patent application is a continuation of and claims priority to co-pending U.S. patent application Ser. No. 15/485,927, entitled "TRAILER AND HOUSING SYSTEM", filed on Apr. 12, 2017, which claims priority to U.S. Provisional Patent Application Ser. No. 62/321,450 filed on Apr. 12, 2016, and entitled "HAUL TRAILER WITH ELEVATING ROOF." The entireties of both above-identified patent applications are hereby incorporated by reference into the present non-provisional patent application.

FIELD OF THE INVENTION

The present invention is directed to a mobile housing system, e.g. a travel trailer, camper trailer, work trailer, food trailer, concession trailer, hunting outfitter, military trailer, or the like. In particular, embodiments of the present invention are directed to a trailer and housing system with a housing that may be removed from the trailer, friction-reducing members that enable the weight of the housing to be adjusted/distributed on the trailer, an elevating roof with a safety linkage system, and/or an adjustable cargo rack.

BACKGROUND

Mobile housing trailers, e.g. travel trailers and camper trailers, provide home-like amenities in a variety of locations, especially remote locations. These trailers are often pulled behind motorized vehicles to remote locations where home-like amenities would not otherwise be available. Some of these home-like amenities include a stove-top, a sink with running water, electricity, lighting, etc. Since these trailers are often being moved from one location to another, there is a need for a mobile housing trailer that provides some of these amenities in the most compact form possible. There is also a need for mobile housing trailer that is adjustable to accommodate various hauling and living circumstances.

SUMMARY OF THE INVENTION

In one embodiment of the present invention, there is provided a transportable housing system comprising a lower housing, an upper housing, one or more support structures, and an actuator. The upper housing is vertically shiftable relative to the lower housing, and the upper housing is vertically shiftable between a lowered position and a raised position. The support structures are associated with the upper housing and shiftable in and out of a support configuration. The support structures are also configured to be shifted to the support configuration when the upper housing is shifted from the lowered position to the raised position. In the support configuration, the support structures are configured to support the upper housing in the raised position. The actuator is associated with the support structures and configured to disengage the support structures from the support configuration to permit lowering of the upper housing.

In another embodiment of the present invention, there is provided a trailer and housing system for being pulled behind a vehicle. The trailer and housing system comprises a trailer and a housing. The trailer includes a frame having a front end and a back end, a set of wheels supporting the frame on the ground, and one or more friction-reducing members configured to be slidably attached to the frame. The housing is configured to be removably secured to the trailer. Additionally, the housing is configured to be positioned on the friction-reducing members allowing the housing and friction-reducing members to be adjusted forward towards the front end of the frame and adjusted back towards the back end of the frame.

In yet another embodiment of the present invention, there is provided a method for securing and adjusting a housing on a trailer. The method comprises positioning the housing above the trailer. The trailer comprises a frame having a front end and a back end, a set of wheels supporting said frame on the ground, and a plurality of friction-reducing members configured to be slidably attached to the frame. The method additionally comprises securing the housing to the friction-reducing members and adjusting the housing with respect to the trailer such that the housing and the friction reducing members slide forward toward the front end of the frame or slide back towards the back end of the frame.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 13B is a lower back perspective broken away view of an upper portion of the housing from FIG. 10;

FIG. 13C is an assembly view of a lateral arm and a sleeve configured to extend or contract the upper walls as awnings, as is illustrated in FIGS. 13A and 13B;

Figure 1:
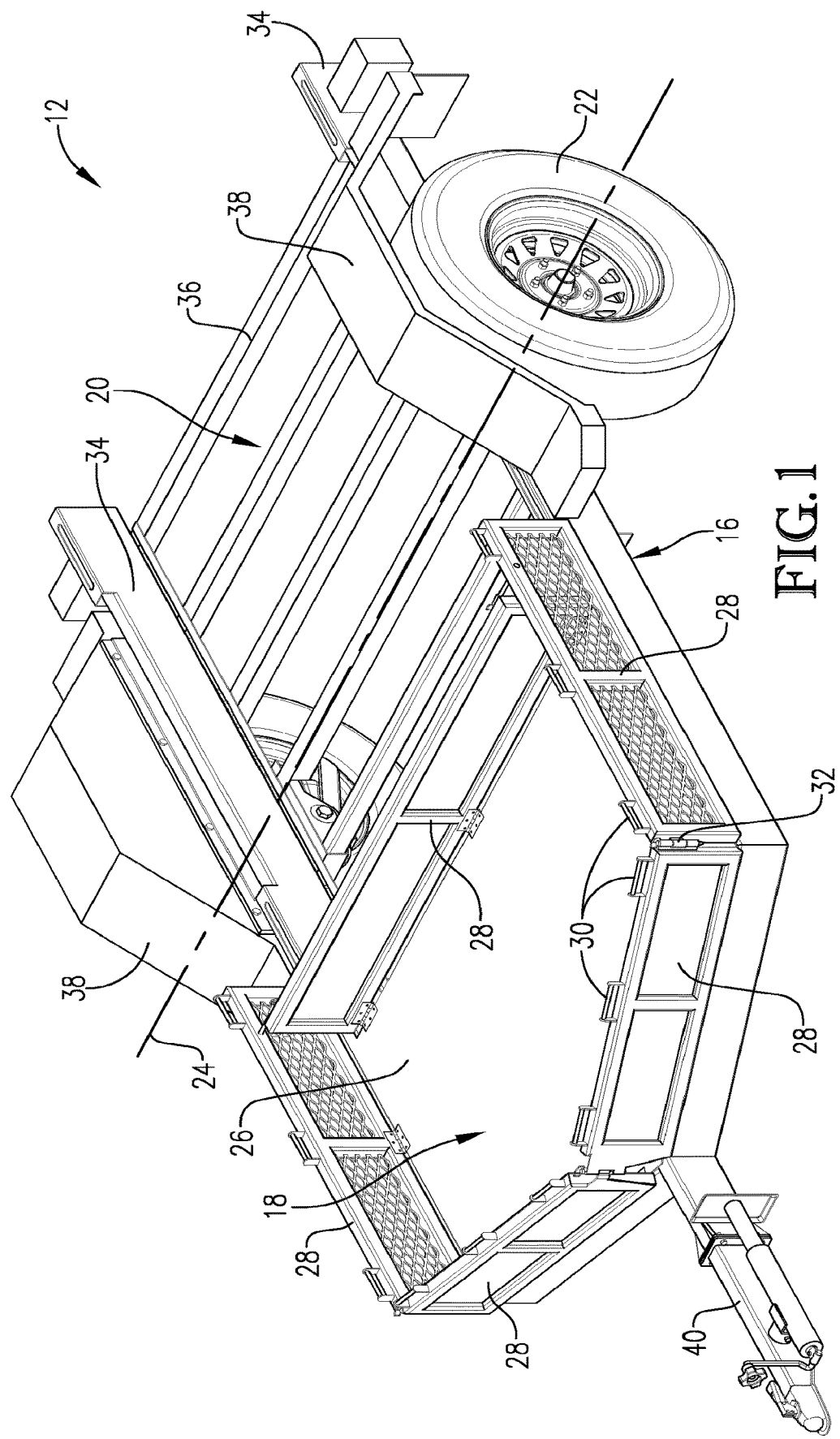
FIG. 1 is a perspective view from a front end of the trailer with gates folded up in an upright position in accordance with various embodiments of the present invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Various embodiments of the present invention are generally related to a housing and trailer system comprising a trailer and a housing. The housing may be removed from the trailer and self-supported by a plurality of legs. The housing may also be positioned on friction-reducing members that reduce friction between the housing and trailer. The reduction of friction facilitates the housing to be more efficiently adjusted (e.g., by sliding) on the trailer so that a user may distribute the weight of the housing on the trailer. The housing may also comprise a safety lever and a linkage system, whereby the user may safely actuate the lever while standing outside the housing. The housing may comprise an upper housing and a lower housing, with the upper housing being vertically shiftable relative to the lower housing. Actuating the lever may actuate a linkage system so as to cause roof support structures, which support the upper housing in the raised position, to disengage to permit the upper housing to lower. The user may desire to disengage the roof support structures from outside the housing while the roof is elevating or lowering. The housing system may also comprise an adjustable cargo rack that may be adapted to accommodate various shapes, sizes, and quantities of cargo.

FIG. 1 depicts a housing and trailer system 10 according to embodiments of the present invention. The housing and trailer system 10 comprises a trailer 12 and a housing 14. The trailer 12 may be configured for transporting the housing 14 and miscellaneous goods, specifically camping goods, such as all-terrain vehicles ("ATVs"), kayaks, coolers, tents, firewood, etc. Another vehicle, e.g. a motor vehicle, may tow the trailer 12 transporting the housing 14 and goods.

As depicted in FIG. 1, the trailer 12 may include a frame 16 having a front end 18 and a back end 20. In various embodiments, the front end 18 may be 64 inches wide by 47 inches long and the back end may be 60¾% inches wide by 72½ inches long. Hereinafter, all directional descriptions are from the perspective of a user positioned at the back end 20 of the trailer 12 and facing the front end 18 of the trailer 12. The frame 16 may be formed from various metals, e.g., steel, iron, aluminum, and the like. The components defining the frame 16 may be formed out of sections of sheet metal, cut tubes, c-channel, and other frame structures readily apparent to one of ordinary skill in the art. Such components may be secured together by welding, fasteners, and/or other methods of attachment.

A set of wheels 22 may be positioned about an axis 24 and attached to the frame 16 so as to support the frame above the ground. In some embodiments, the wheels 22 may be connected to each other by an axle (defining the axis) and connected to the frame 16 by a suspension. The trailer 12 may have single axle, dual axle, tandem axle, or plurality of axles for connecting the wheels 22. In a preferable embodiment, an axle-less suspension system may connect the wheels 22 to the frame 16. This axle-less system is beneficial for traveling off-road because it provides maximum ground clearance for the trailer 12.

The front end 18 of the frame 16 may include a removable deck plate 26 positioned on top of the frame 16. The removable deck plate 26 may function as a floor so goods may be placed on top of the deck plate 26. The front end 18 and deck plate 26 may form any shape and be surrounded by one or more gates 28 defining a perimeter of the front end 18. In some embodiments, the front end 18 and deck plate 26 form the shape of a pentagon having a gate 28 for each of the five sides.

The gates 28 may be solid or mesh, and the top of each gate 28 may have one or more strap brackets 30 welded or otherwise attached on a top side of each gate 28. Straps or the like may be secured to the strap brackets 30 and secured to the goods and/or the housing 14 in order to hold these items in place while the trailer 12 is moving. The gates 28 may be hingedly attached to the trailer frame 16 and may fold up and down depending on the configuration desired by the user. As illustrated in FIG. 1, the gates 28 may fold up to an upright position substantially perpendicular to the deck plate 26 or frame 16. Once the gates 28 are upright, the user may insert a locking mechanism to lock the gates 28 in the upright position. In some embodiments, each gate 28 may have a lock receiver 32 on one or more sides of the gate 28. When the gates 28 are in an upright position and the lock receivers 32 corresponding to adjacent gates 28 are aligned, then a locking pin may be inserted through each lock receiver 32, which locks the adjacent gates 28 together in an upright position. When all the gates 28 are in an upright position, the gates 28 may form an enclosure surrounding the front end 18 of the trailer 12. The enclosure may help contain or secure goods, e.g., a cooler and firewood, in the front end 18.

Figure 2:
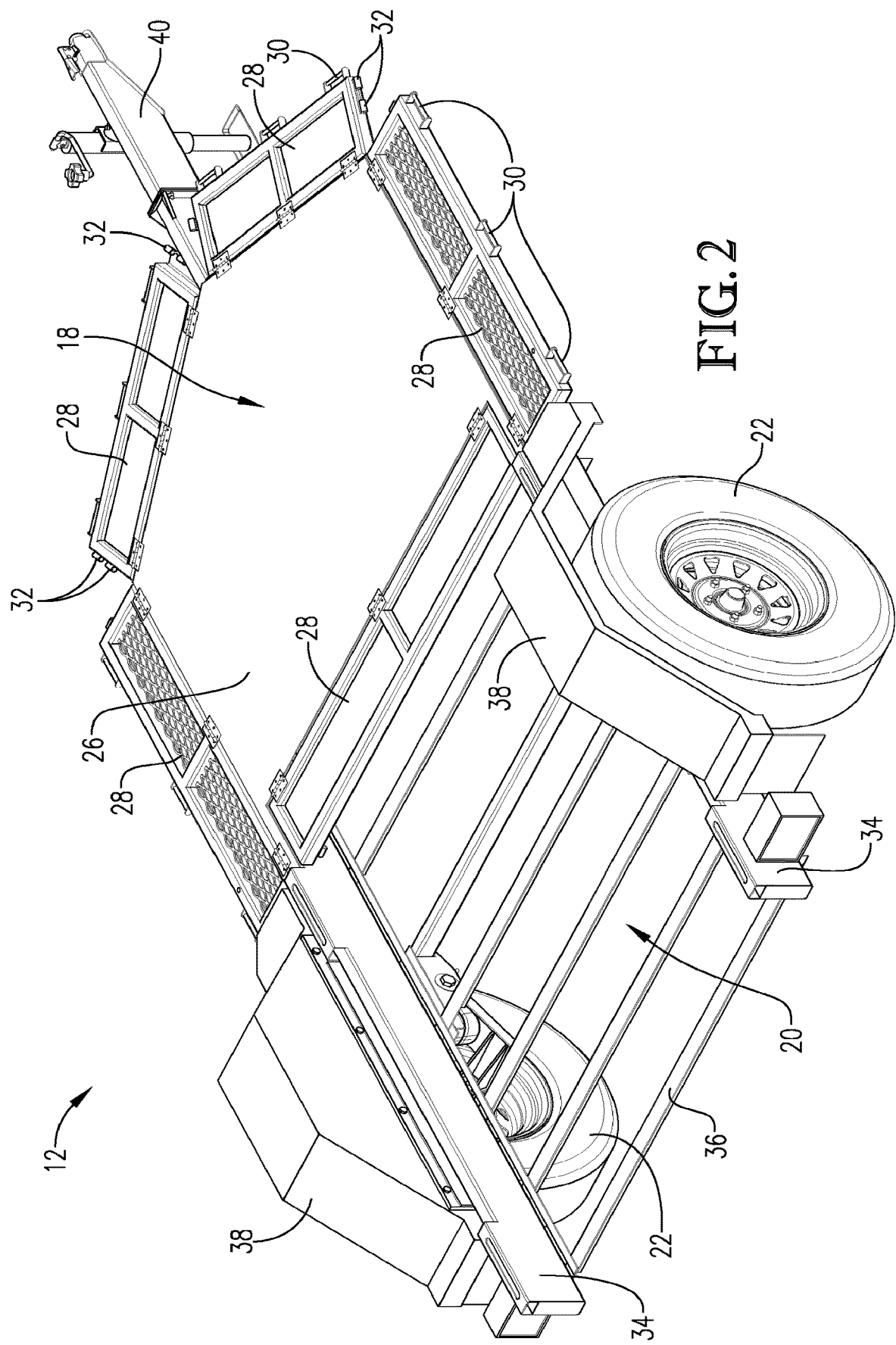
FIG. 2 is a perspective view from a back end of the trailer from FIG. 1, with the gates folded down in a flat position.

As illustrated in FIG. 2, the gates 28 may fold down in a flat position substantially parallel to the deck plate 26 or frame 16. When the gates 28 are folded to this flat position, a greater floor surface area will be available in the front end 18. For example, when the gates 28 are down, the deck plates 26 and gates 28 together may form a trailer floor. Such an arrangement may be beneficial for transporting large goods, such as an ATV, that may be too large to fit in the front end 18 when the gates 28 are in the upright position, but may fit when the gates 28 are laid flat in the down position. In addition, the folding functionality of the gates 28 may facilitate loading/unloading goods on the trailer 12.

The back end 20 of the frame 16 may include a rear drop-down deck configured for receiving the housing 14. In some embodiments, the back end 20 may include a first set 34 of trailer support structures positioned perpendicular to the wheel axis 24 that define an outer perimeter of the frame 16 and/or back end 20. The back end 20 may also include a second set 36 of trailer support structures attached to the first set 34 such that the second set 36 is perpendicular to the first set 34 and parallel to the axis 24. In some embodiments, the trailer support structures may be bars, tubes, beams, c-channel and/or the like. Additional trailer support structures, e.g. c-channel, may be welded onto the frame 16.

The trailer 12 may include removable fenders 38 that provide additional versatility for the trailer 12. For example, the fenders 38 may obstruct the loading or unloading of certain cargo, so the fenders 38 may be removed to eliminate the obstruction. The trailer 12 may also include a removable tongue 40 extending distally from the front end 18 of the trailer 12. The length of the removable tongue 40 may be increased by fastening an extension to a distal end of the tongue 40. The tongue 40 may also include a tongue jack for raising or lowering the tongue 40 and trailer 12. The trailer 12 may also be equipped with standard lighting, safety chains, and electric brakes as would be readily apparent to one of ordinary skill in the art.

The trailer 12 may include an electric plug. The electric plug may be a female electric plug, or more specifically, a female six pole round trailer end plug. In some embodiments, the plug may be located on the back end 20 of the trailer 12. Specifically, the plug may be located on the trailer's 12 rear driver-side taillight housing. The plug may receive and/or connect its counterpart plug to provide an electrical connection to the housing 14. More specifically, the plug may provide an electrical connection to the housing's taillights and charge the housing's battery, among other functions that are common for trailer plugs and readily apparent to one of ordinary skill in the art.

Figure 3:
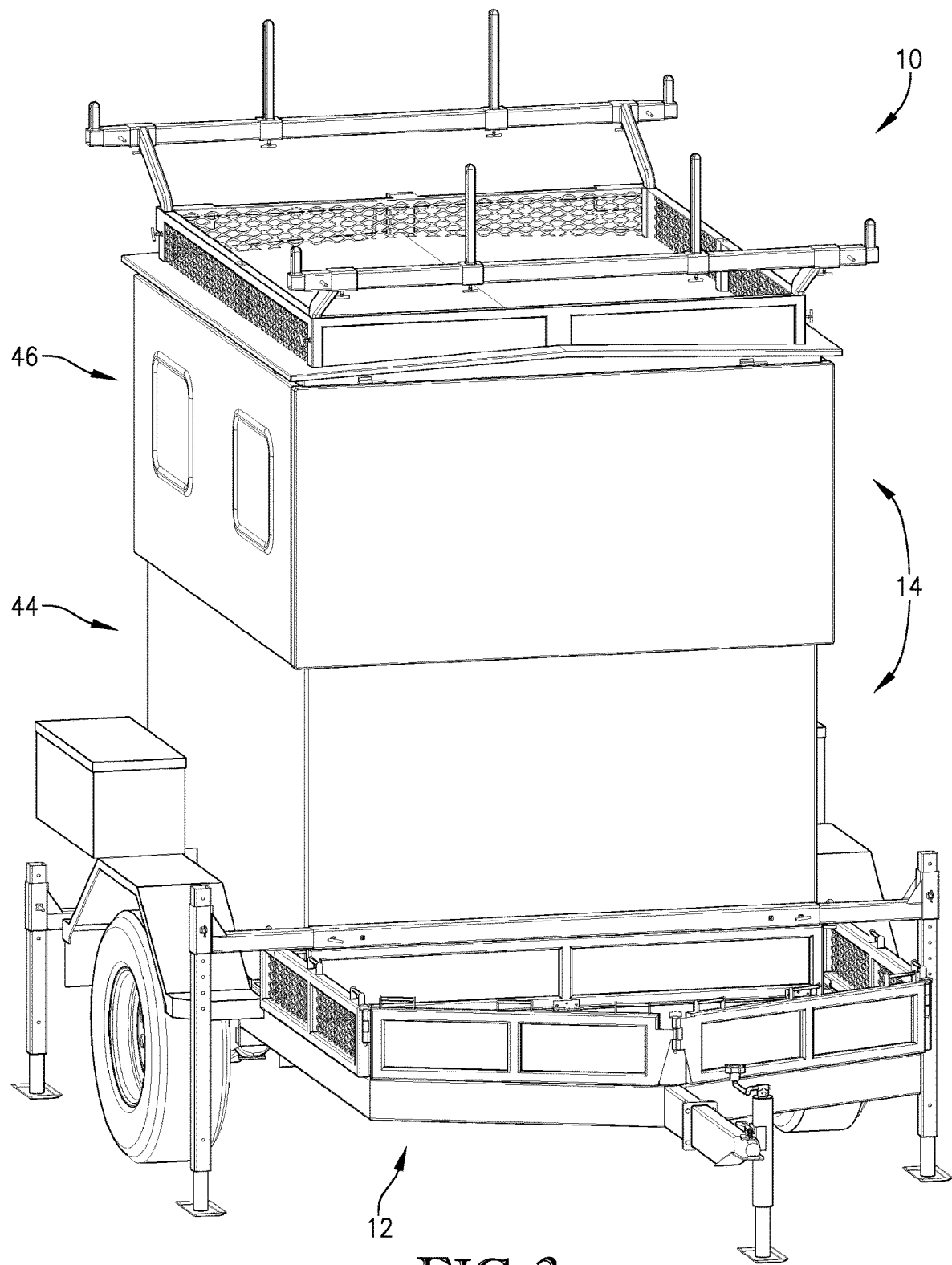
FIG. 3 is a perspective view of the trailer from FIGS. 1-2 and a housing positioned thereon to form a trailer and housing system, with the housing extended in a camping mode.

Turning to the housing 14 depicted in FIG. 3, the housing 14 may include a lower housing 44 and an upper housing 46. The upper housing 46 may have a longer perimeter than the lower housing 44, which may allow the lower housing 44 to be recessed within the upper housing 46. It is contemplated that in alternative embodiments, the lower housing 44 may have a greater perimeter than the upper housing 46, which may allow the upper housing 46 to be recessed within the lower housing 44.

Figure 4A:
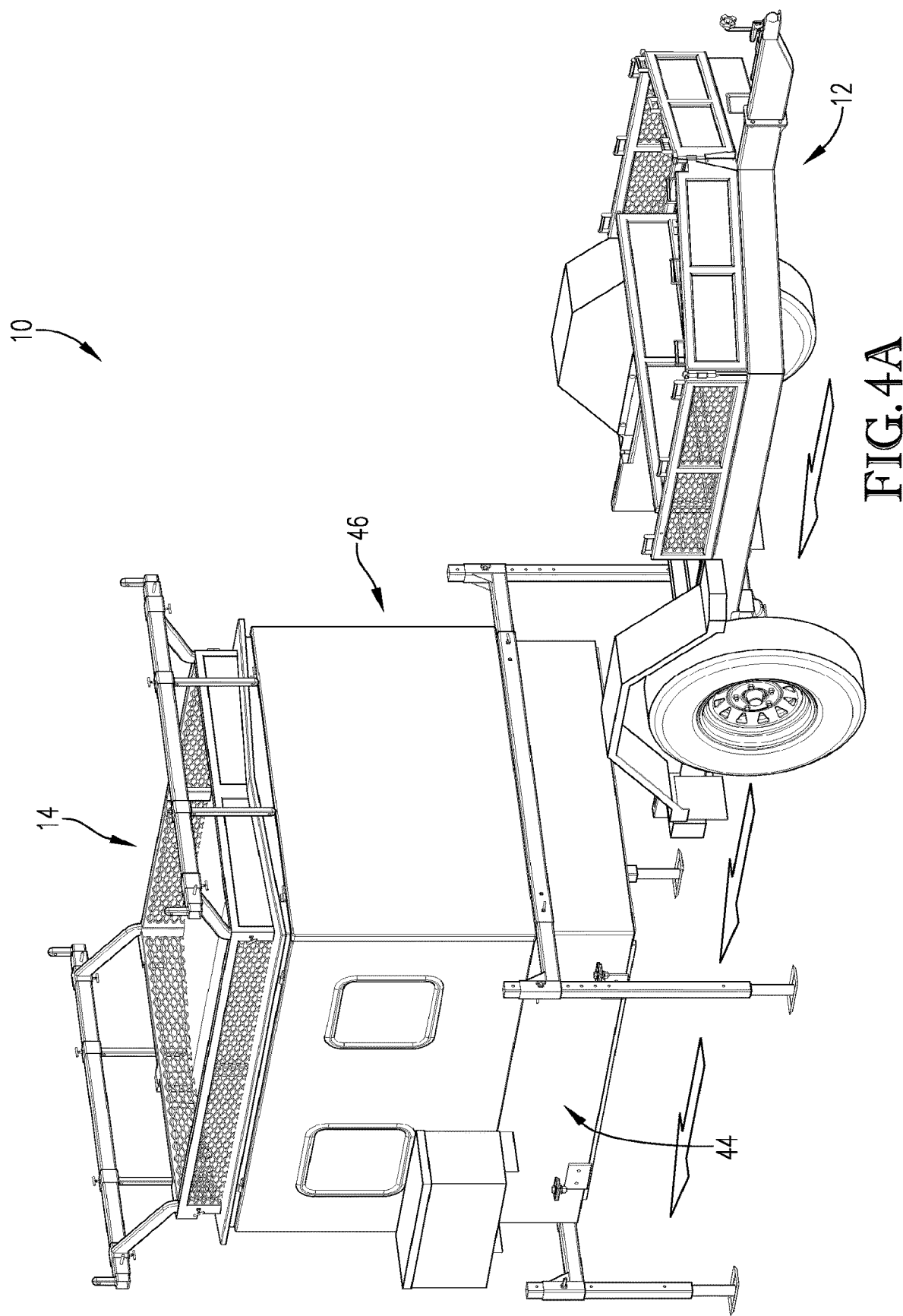
FIGS. 4A and 4B are perspective views of the trailer and housing system from FIG. 3, each with the housing contracted in a travel mode, with FIG. 4A illustrating the housing being separated from the trailer, and with FIG. 4B illustrating the housing being positioned on the trailer.
Figure 4B:
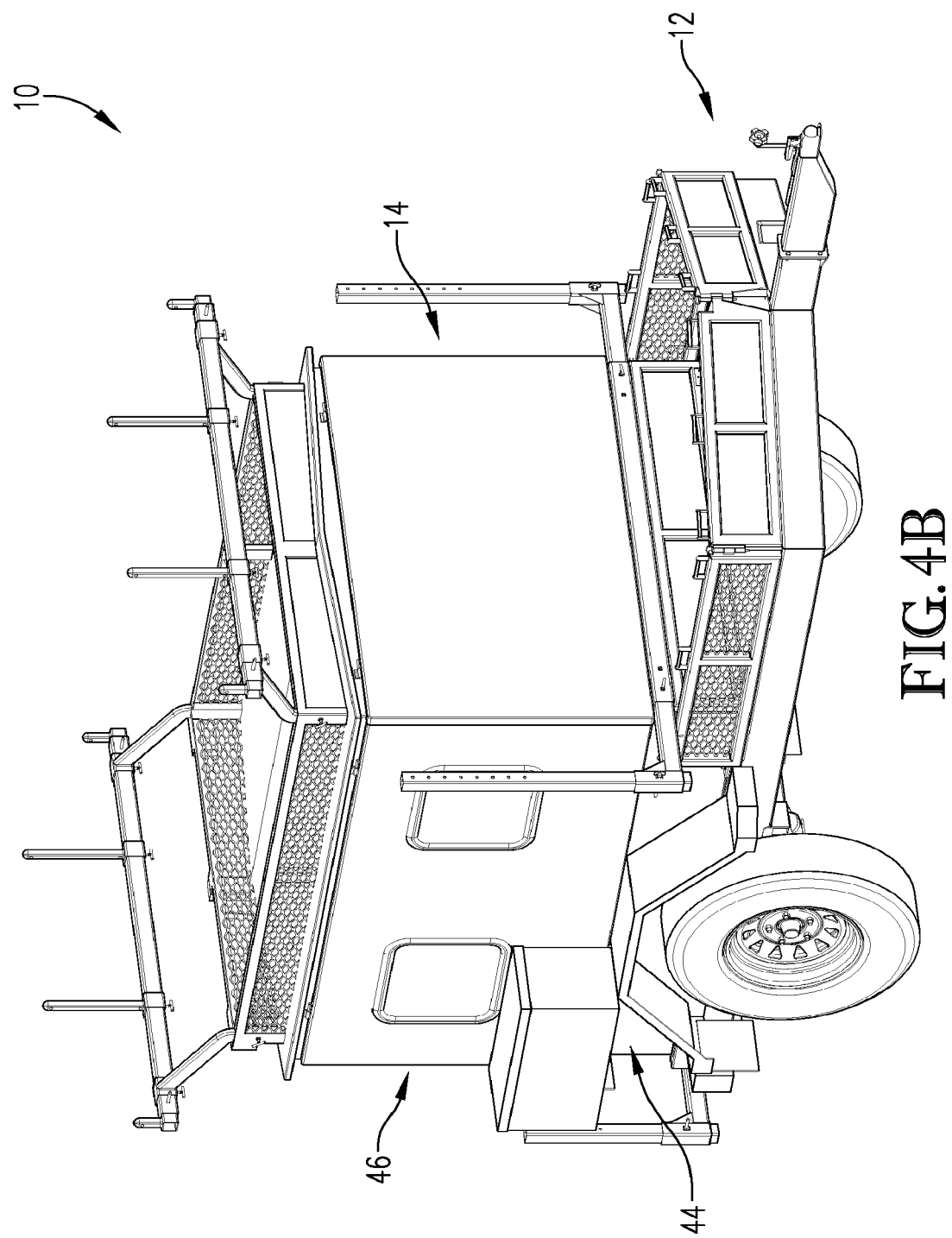

The upper housing 46 and lower housing 44 may be configured to operate in two modes: a travel mode (See FIGS. 4A and 4B) and a camping mode (See FIG. 3). The descriptive names for these modes are not intended to limit the functionality of the modes to any specific use. In some embodiments, the upper housing may be in a raised position relative to the lower housing, e.g. camping mode. The upper housing may also be in a lowered position relative to the lower housing, e.g. travel mode. The upper housing 46 may be hydraulically actuated (as described in more detail below) to transition the housing 14 from camping mode to travel mode and vice versa. The upper housing 46 may be actuated such that the volume of the housing 14 in camping mode may be at least 1.25×, 1.5×, 1.75×, 2×, 2.25×, 2.5×, or 2.75× greater than the volume of the housing 14 in travel mode and/or no more than 6×, 5×, 4× or 3× greater than the volume of the housing 14 in travel mode. Additionally, the height of the housing 14 (including lower and upper housing) in camping mode may be 79¼ inches. Travel mode may be preferable when the housing 14 is being transported because travel mode may reduce the housing 14 to its most compact form. In travel mode, the upper housing 46 may be lowered to substantially surround the lower housing 44 such that the upper and lower housings 46 and 44 are positioned at substantially the same height. In the camping mode, the upper housing 46 may be raised so as to be positioned above the lower housing 44. Furthermore, the interior space of the housing 14 is enlarged, such that the camping mode may be preferable when the housing 14 is stationary. The upper housing 46 may be positioned above the lower housing 44 such that the bottom of the upper housing 46 slightly overlaps with the top of the lower housing 44. It is foreseen that the housing 14 may be used for other purposes in the two example modes given. For example, the housing 14 may be used vice-versa, that is, it may be used to travel in camping mode and it may be used to camp in travel mode. Additionally, maintenance may be performed on the housing 14 in either mode. The uses for the housing 14 are not limited to the aforementioned examples.

In addition to the aforementioned expandable/contractible housing features, the housing 14 may also slide back and forth on the trailer 12 in order to distribute and/or stabilize the weight of the housing 14 on the trailer 12. For example, the housing 14 may shift/slide forward toward a front end 18 of the trailer or the housing may shift/slide back toward a back end 20 of the trailer 12. The features enabling the shiftable/slidable housing functionality will be described in more detail below.

Figure 5:
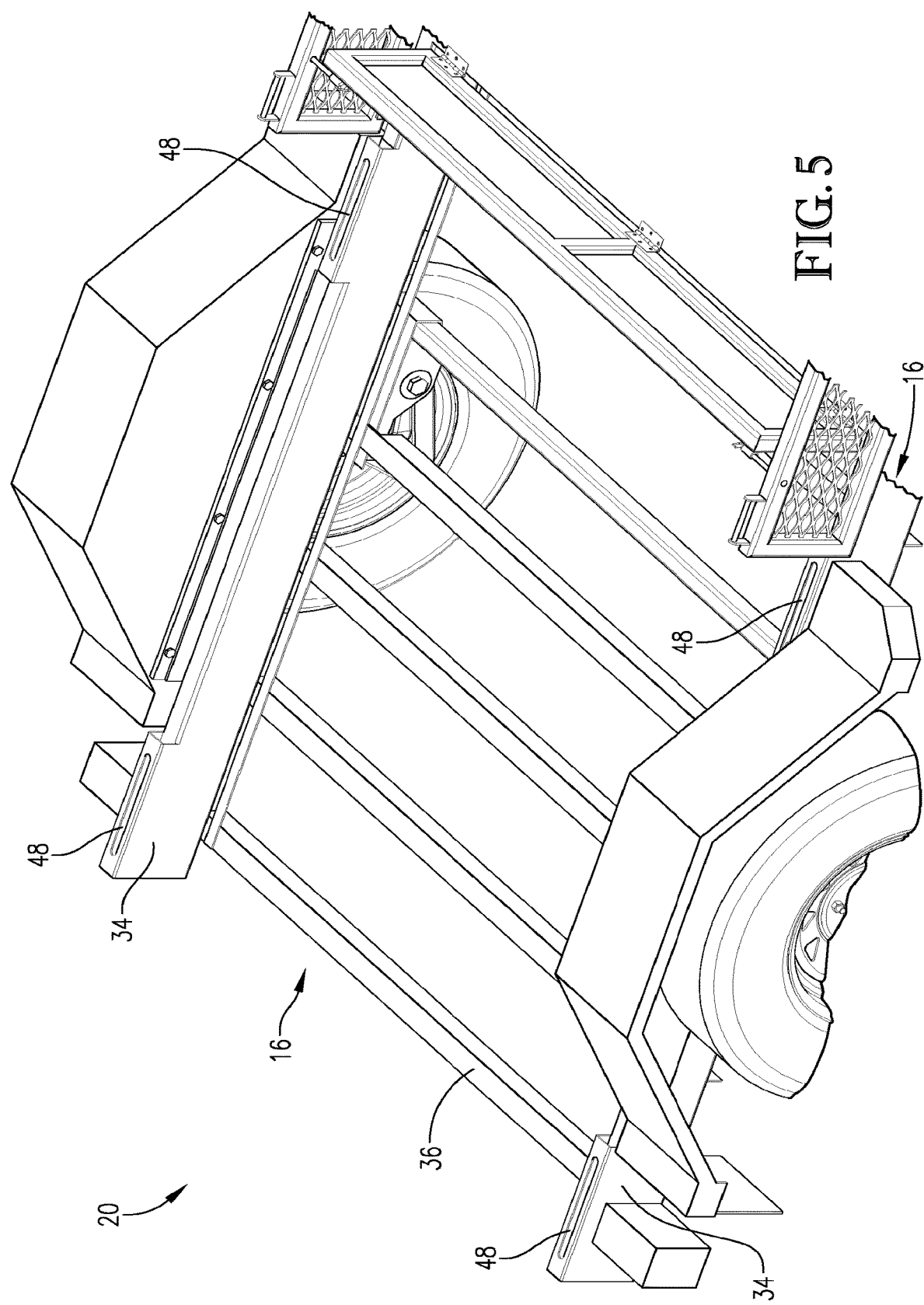
FIG. 5 is a perspective, broken away view of a portion of the back end of the trailer from FIGS. 1-2.

As depicted in FIG. 5, the frame 16 of the trailer 12 may include one or more slots 48 cut in a top end of the frame 16. Furthermore, the first set of trailer support structures 34 may include one or more slots 48 cut in a top end of the trailer support structures 34. In some embodiments, a first set of c-channel may comprise one or more slots 48 cut in the top of the c-channel. Further embodiments may include c-channel with a slot 48 in its top end, and the c-channel may be welded onto the first set 34 and/or second set 36 of trailer support structures. The slots 48 may be an elongated aperture. The slots 48 may span about the length of one of the trailer support structures 34 and 36 and/or c-channel structures. This elongated shape may be beneficial to permit the slots 48 to receive a fastener, e.g. a bolt, that secures the housing 14 to the trailer 12. When the fastener has secured the housing 14 to the trailer 12, then the fastener may slide within the length of the slot 48 thereby allowing the housing 14 to also move and/or slide about the length of the slot 48. In other embodiments, the fastener may lock the housing 14 in place, such as via a nut threaded on the bolt, to prevent the housing 14 from sliding with respect to the trailer 12.

Figure 6:
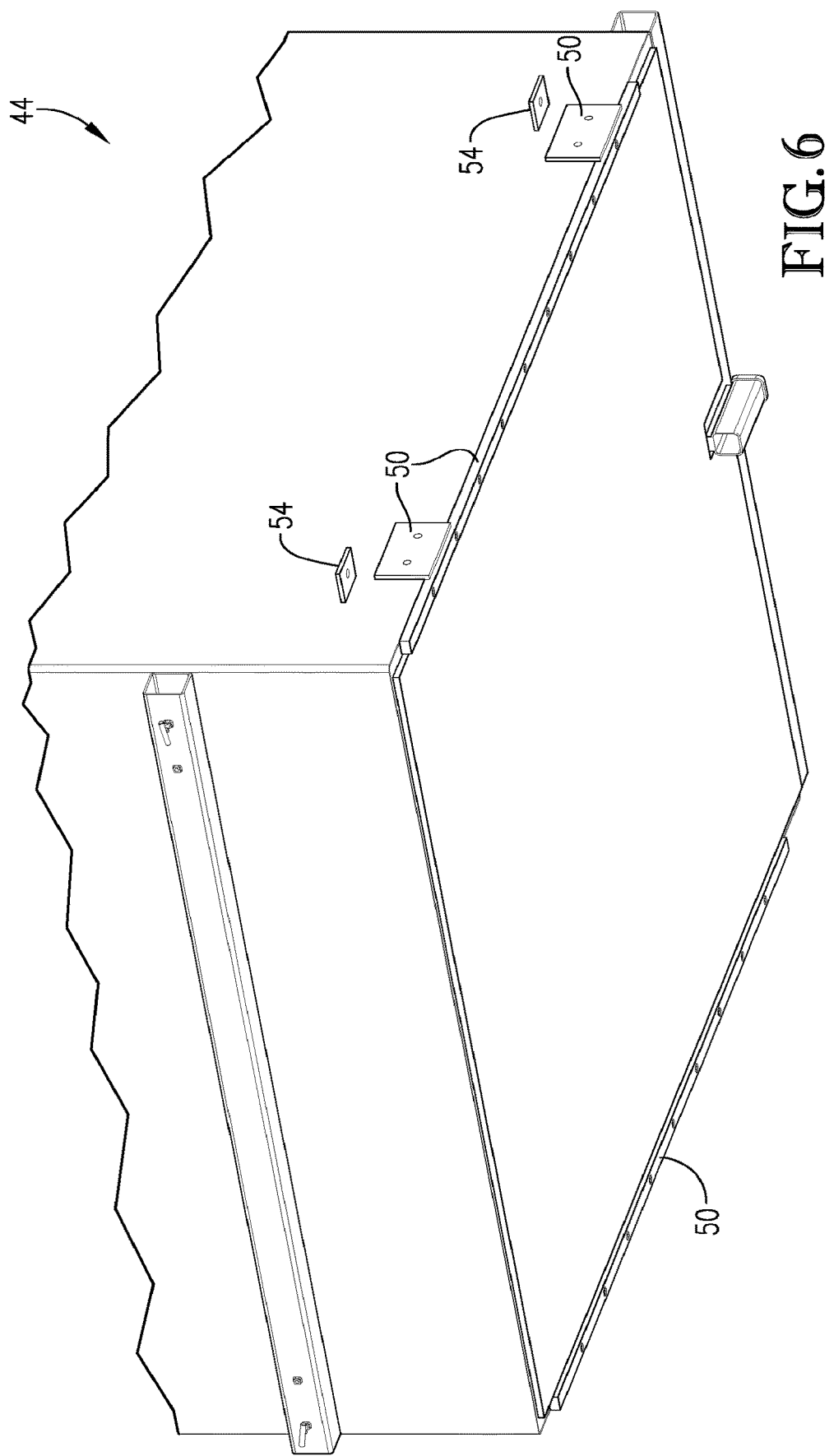
FIG. 6 is a lower front left perspective, broken away view of a portion of the lower housing from the trailer and housing system of FIG. 3.
Figure 7:
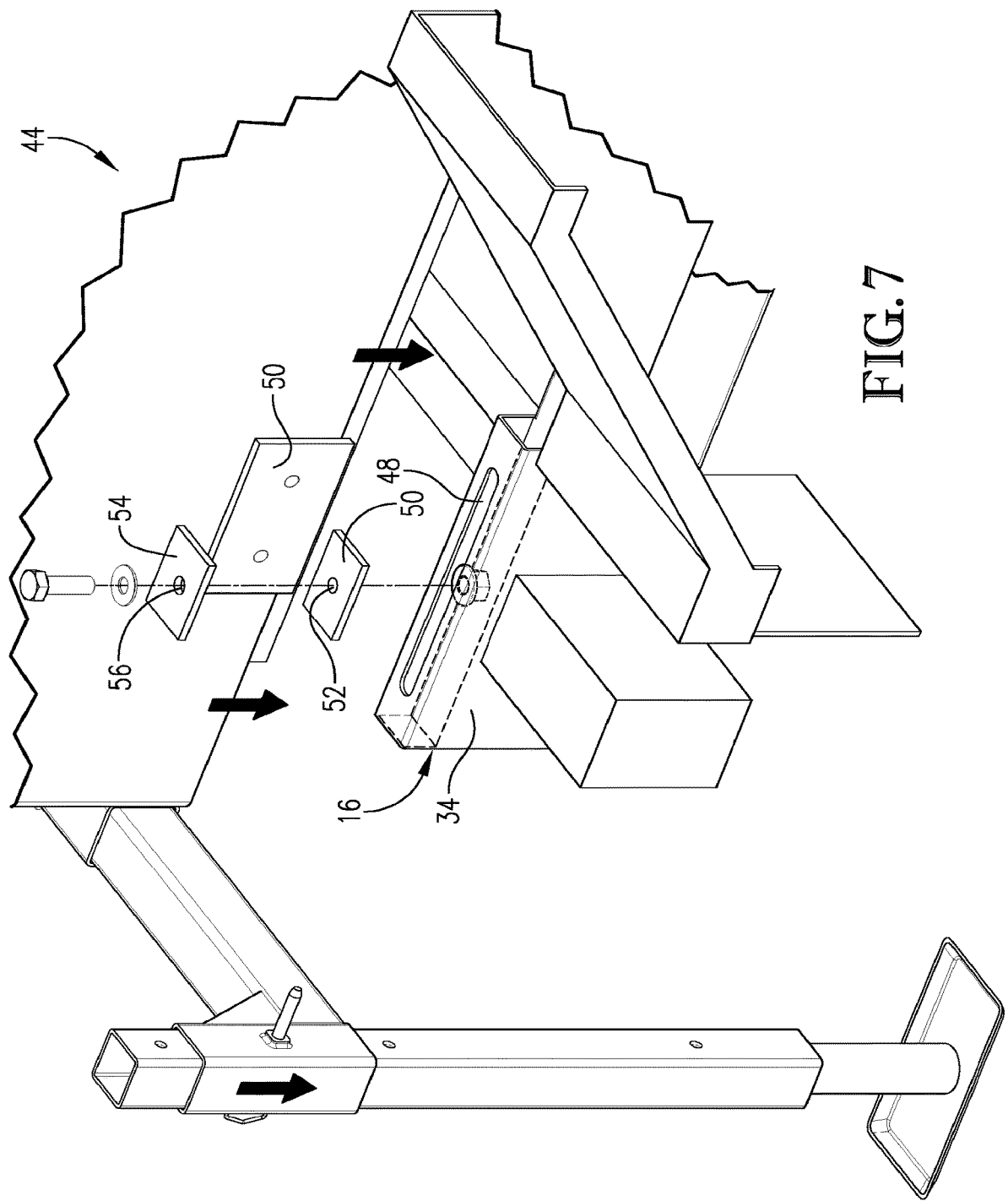
FIG. 7 is a back right assembly view of a tab on a lower portion of the housing from the trailer and housing system of FIG. 3, particularly illustrating the housing being securable to a trailer slot formed in the trailer from FIG. 3 by way of a friction-reducing member.
Figure 8:
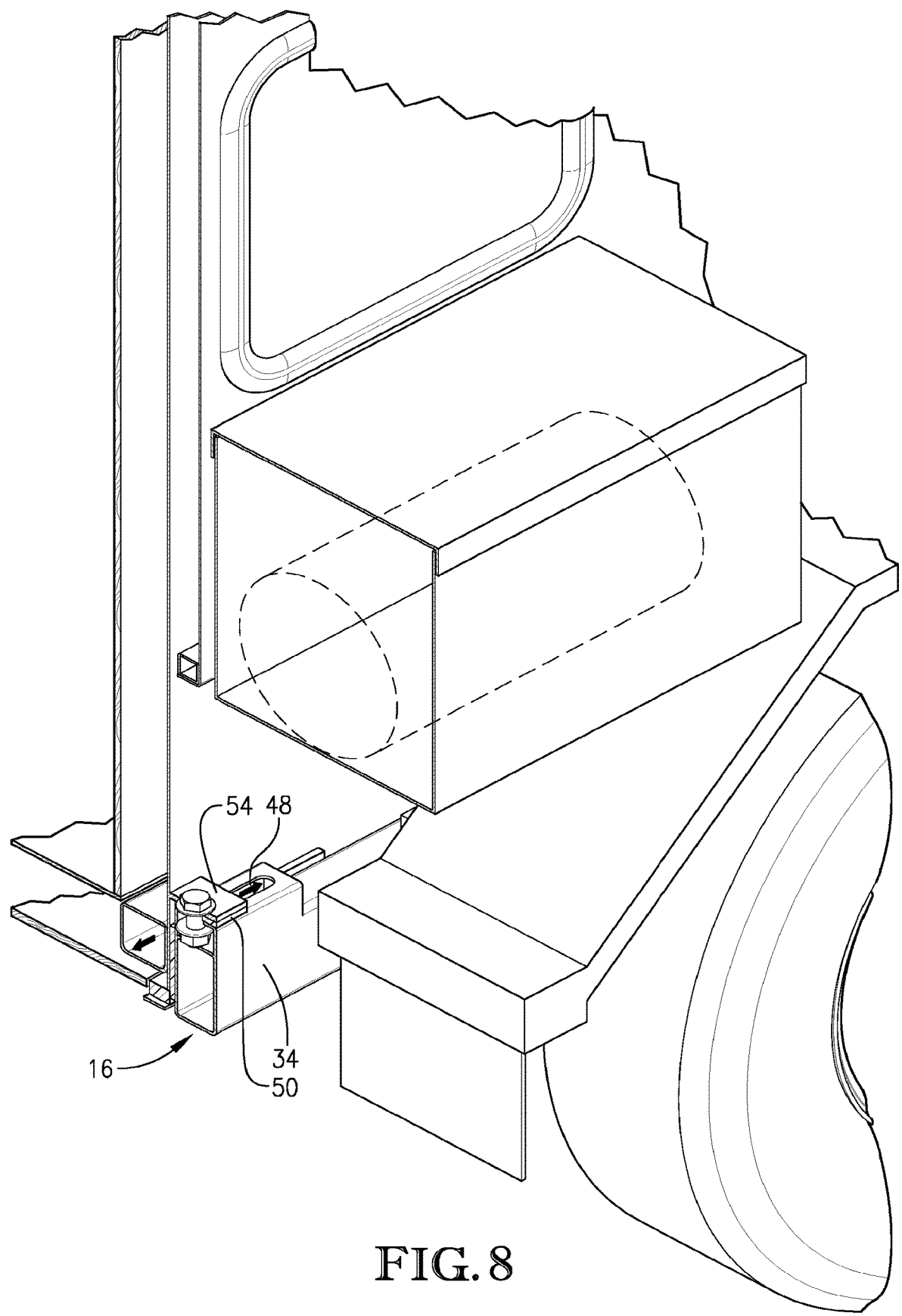
FIG. 8 is a cutaway isometric view of a back right corner of the trailer and housing system from FIG. 3.

As illustrated in FIGS. 6-8, embodiments of the present invention may include one or more friction-reducing members 50 that may be planar, may include a planar section, and may be formed in various shapes, e.g. square or rectangular, as required. The friction-reducing members 50 may reduce friction between the housing 14 and the trailer 12 to facilitate the housing 14 sliding on the trailer 12. In some embodiments, the friction-reducing members 50 may comprise engineering thermoplastics and/or synthetic polymers, and more specifically, the friction-reducing members 50 may comprise polyoxymethylene, acetal, polyacetal, polyformaldehyde, polyethylene, and/or ultra-high-molecular-weight polyethylene. In various embodiments, the friction-reducing members 50 may have an aperture 52 for receiving a fastener, and the members 50 may be positioned between the housing 14 and the frame 16. The trailer 12 may include friction-reducing members 50, or the friction-reducing members 50 may be separate from the trailer 12. The friction-reducing members 50 may be placed on the frame 16, such as on the first set of trailer support structures 34 or the c-channel structures, such that the aperture 52 of the friction-reducing member 50 is substantially aligned with the slot 48. The friction-reducing members 50 may be placed in a horizontal position or vertical position on the frame 16. For example, the friction-reducing members 50 may contact the floor of the housing 14 or one or more of the walls of the housing 14. The friction-reducing members 50 may be secured to the frame 16 of the trailer 12 via a fastener. The fastener may be inserted and fastened through the housing 14, the friction-reducing members 50, and into the slot 48, thereby securing the housing 14 to the frame 16 and/or trailer 12.

A tab 54 with an aperture 56 may be included in the lower housing 44 and may be attached to one of the exterior walls of the lower housing 44. A side of the tab 54 may be attached to the housing 44 such that the tab 54 is cantilevered and projects outwardly from the housing 44. The tab 54 may also be attached such that the aperture 56 is oriented vertically and may be configured to receive a fastener vertically inserted through the aperture 56.

The user may improve towing for the trailer 12 by adjusting the position and weight of the housing 14, which may reduce the forces being applied to the tongue 40 of the trailer 12. Adjusting the position of the housing 14 may also help distribute the weight of the housing 14 on the trailer 12. The user may also slide the housing 14 to create more room on the front end 18 of the trailer 12 for larger items. The tabs 54, friction-reducing members 50, and slots 48 may together enable the housing to shift/slide back and forth on the trailer 12. As illustrated in FIG. 7, the housing 14 may be positioned above the trailer 12 such that the tabs 54 of the housing 14, the friction-reducing members 50, and the slots 48 of the trailer 12 are vertically aligned. For example, the friction-reducing members 50 may be placed over the slots 48 on the frame 16, and the tabs 54 may be placed on the friction reducing members 50. The fastener may then be inserted through the tabs' aperture 56, the friction-reducing members' aperture 52, and the slots 48 to secure the three components together. Once the tabs 54 are on the friction-reducing members 50 and the friction-reducing members 50 are on the trailer 12, then the housing may slide on the trailer 12 as the friction-reducing members 50 reduce friction between the housing 14 and the trailer 12. The distance the housing 14 shifts/slides may be limited by the length of the slots 48 because the fastener may prevent the housing 14 from moving further once the fastener reaches an end of the slot 48.

Figure 9:
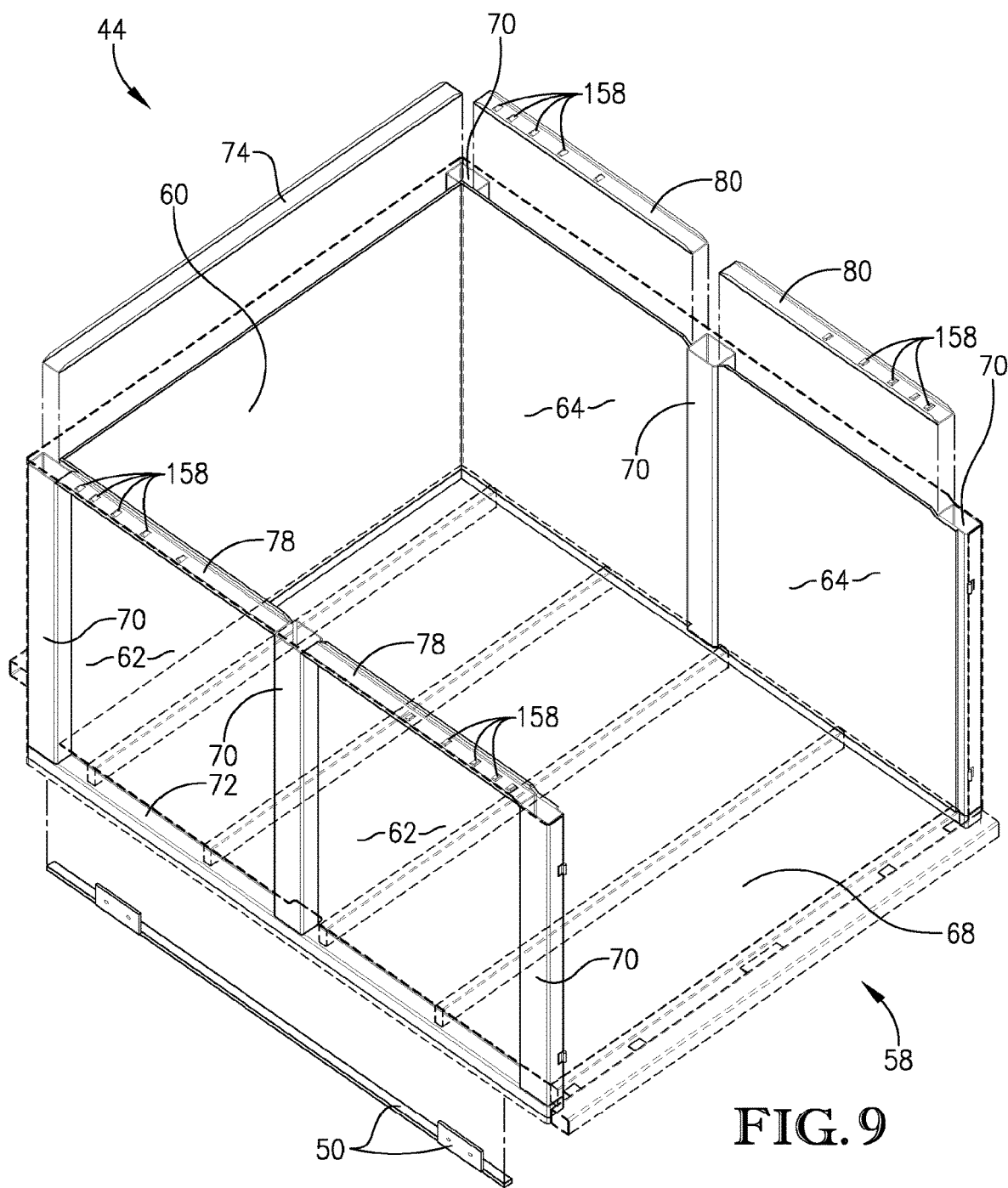
FIG. 9 is an upper perspective view of a lower portion of the housing from FIG. 3, particularly illustrating top lower housing support elements and friction-reducing members.
Figure 10:
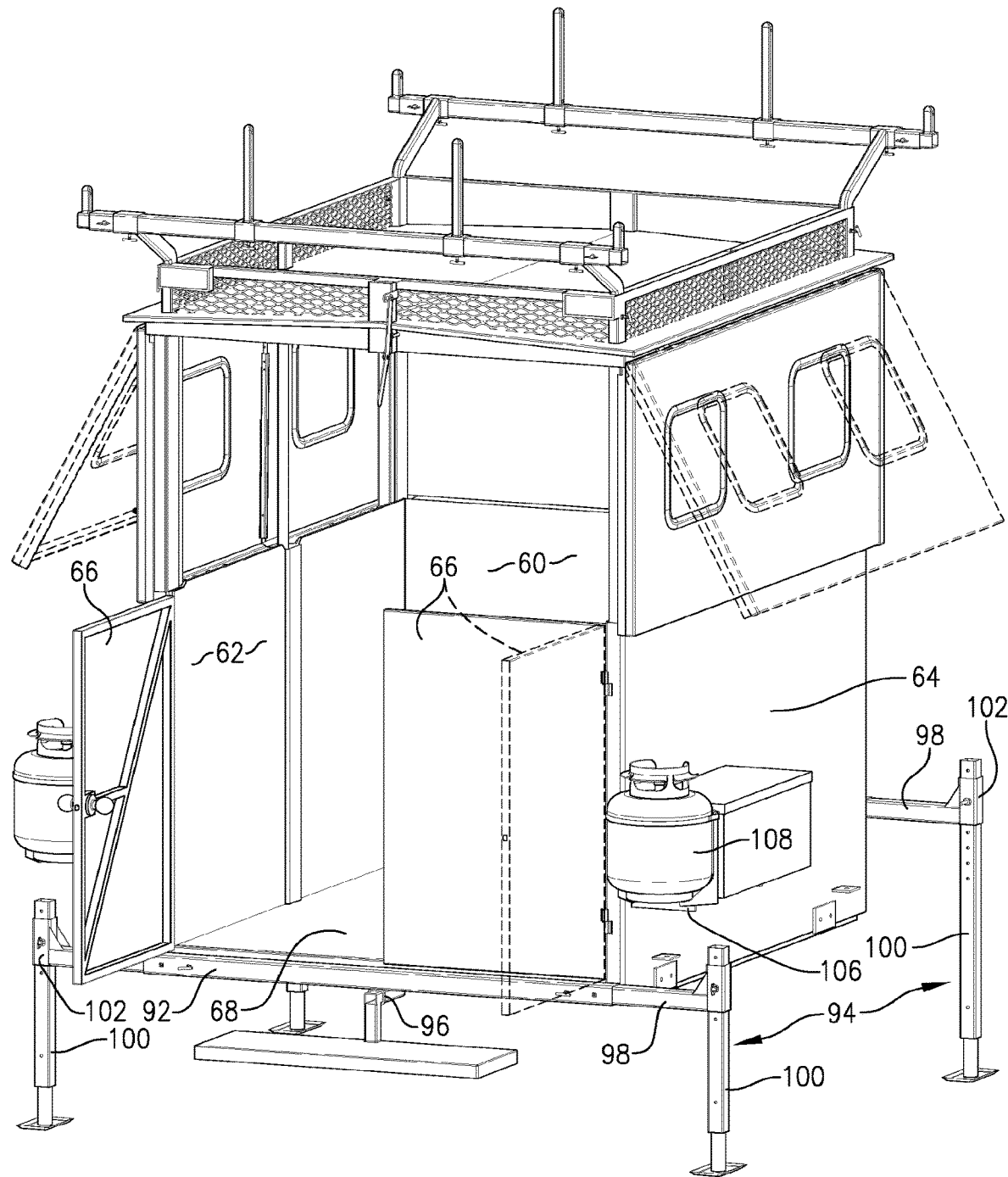
FIG. 10 is a back perspective view of the housing from FIG. 3, particularly illustrating legs supporting the housing, and further illustrating of doors and awnings of the housing.

With respect to the lower housing 44 depicted in FIGS. 9 and 10, the lower housing 44 may comprise a lower housing frame 58, a plurality of walls 60, 62, 64, doors 66, and a floor 68. The lower housing 44 may have a width of 60¼ inches, a length of 72¼ inches, and a height of 50 inches. The doors 66 may have a height of about 46 inches and a width of about 28 inches. The lower housing frame 58 may include upright support elements 70, bottom lower housing support elements 72, and top lower housing support elements 74, 78, and 80. Each of these support elements may comprise metal, e.g. steel or aluminum. The support elements may also comprise metal tubes, c-channel structures, beams, and other housing frame structures readily apparent to one of ordinary skill in the art. For example, the lower housing frame may comprise a steel frame construction.

The lower housing frame 58 may form a box-like structure with four upright lower housing support elements 70 defining the four corners of the box-like structure. Upright lower housing support elements 70 may also be included on the left side and right side of the lower housing 44 between the front left corner and back left corner, as well as between the front right corner and back right corner. Bottom lower housing support elements 72 may be attached to a lower portion of one of the upright lower housing support elements 70 and then attached at the other end to a different one of the one upright lower housing support elements 70, wherein these bottom lower housing support elements 72 may together form a square. Likewise, top lower housing support elements 74, 78, and 80 may be attached on one end to an upper portion of one of the upright lower housing support elements 70 and then attached at the other end to a different one of the one upright lower housing support elements 70, wherein these top lower housing support elements 74, 78, and 80 may together form a square. The top 74, 78, and 80 and bottom 72 lower housing support elements may be perpendicular to the upright lower housing support elements 70. The top lower housing elements may comprise a front 74, left 78, and right 80 top lower housing support element. Likewise, the bottom lower housing element 72 may comprise a front, back, left, and right bottom lower housing support element. The upright lower housing support elements 70, bottom lower housing support elements 72, and top lower housing support elements 74, 78, and 80 together may form a lower housing frame 58 for a box-like structure.

In some embodiments, the lower housing 44 may comprise three walls 60, 62, and 64 and a pair of removable doors 66 that together define a box-like structure for the housing 14. The lower housing 44 may include a front lower wall 60, a left lower wall 62, a right lower wall 64, back left and right doors 66, and the floor 68 that together form an opened-top, box-like structure. The floor 68 may include composite flooring installed on top of plywood. The back left door may be hingedly attached to the left lower wall 62 or upright lower housing support element 70, and the back right door may be attached to the right lower wall 64 or upright lower housing support element 70. The doors 66 may include a steel frame, aluminum siding, and a common locking door handle. It is foreseen that the walls may be straight, flat, and/or curved, and the walls and doors together may form various shapes. The exterior of the walls may comprise any suitable metal, e.g. aluminum, and the interior of the walls may be fully insulated with plywood beadboard. It is foreseen that the interior lower walls may be any wood, metal, or other wall material readily apparent to one of ordinary skill in the art.

Figure 12:
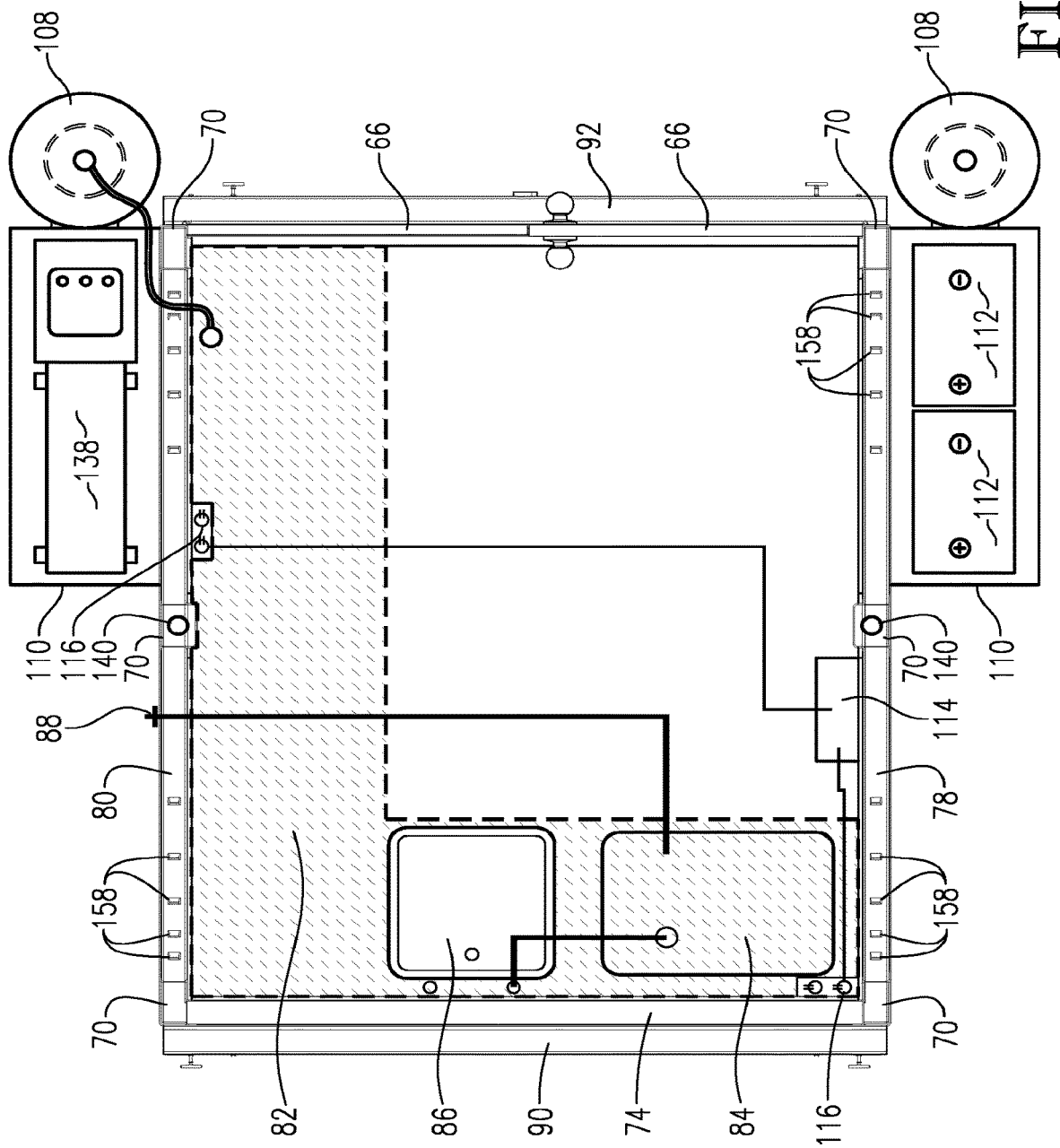
FIG. 12 is a top schematic plan view of an interior of the housing from FIG. 3.

FIG. 12 depicts a schematic plan view of components and structures that may be included in the lower housing 44. For example, a counter top 82 may be contained within the lower housing 44 and attached to one or more of the interior walls. The counter top 82 may comprise wood, metal, butcher block wood, aluminum, granite, and/or other known materials used for counter tops 82. Cabinets, shelves, toolboxes, and the like may be located above, below, and/or beside the countertops 82.

A water tank 84 may be included inside the lower housing 44. Specifically, the water tank 84 may be located beneath the countertop 82 and cabinets but above the floor 68. The water tank 84 may be plumbed to provide water to a bar sink 86, which may be included in the counter top 82. The bar sink 86 may be connected to a drain configured to carry the excess water outside the housing 14. The water tank 84 may also be plumbed to provide water to a water port 88 that may be located in one of the exterior walls. The water port 88 may allow access to water outside of the housing 14. In some embodiments, the water port 88 may only be accessed when the upper housing 46 is raised above the lower housing 44 in camping mode. In travel mode, the upper housing 46 walls may slide over and cover the water port 88 when the upper housing 46 is lowered down over the lower housing 44.

As depicted in FIG. 6, some friction-reducing members 50 may be attached at a lower portion of the left lower wall 62 and the right lower wall 64, and the members 50 may be oriented upright and parallel to the lower walls 62 and 64. Other friction reducing members 50 may be attached beneath the left lower wall 62 and right lower wall 64 such that the members 50 are generally parallel to the floor 68 and perpendicular to the walls 62 and 64. Similar to the aforementioned friction-reducing members 50 on the trailer 12, these members 50 may reduce the friction between the housing 14 and the trailer 12 so that the housing 14 may slide more easily on the trailer 12.

Figure 11:
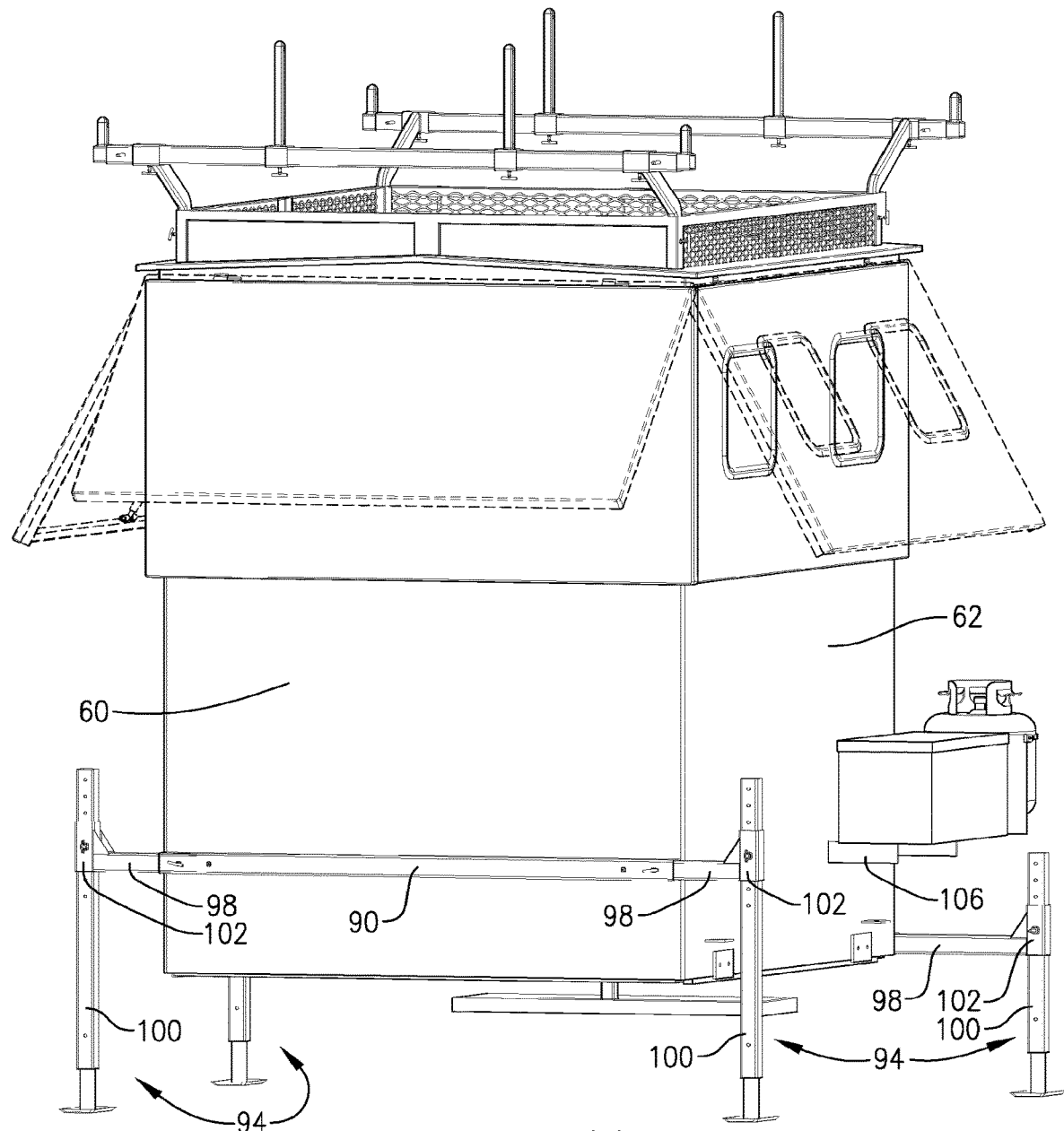
FIG. 11 is a front perspective view of the housing from FIG. 10.

As depicted in FIGS. 10 and 11, a horizontal leg receiver may be included in the lower housing and may be attached to the lower housing. For example, a front horizontal leg receiver 90 may be attached to the exterior of the lower front wall 60, and/or a back horizontal leg receiver 92 may be attached below the back left and right doors 66. The horizontal leg receiver may be a square metal tube, may include one or more apertures, and it may be welded on the lower housing 44. The horizontal leg receiver may be attached to one of the walls such that the length of the horizontal leg receiver extends the width of the wall. The horizontal leg receiver may also be attached below the doors to serve as a weather-proof threshold for the doors. The horizontal leg receiver may be configured to slidably receive extendable legs 94.

A tow hitch 96 may be welded or otherwise attached on the bottom of the back horizontal leg receiver 92. The tow hitch 96 may be configured to receive any receiver hitch approved by the Department of Transportation and may be configured to haul additional trailers. The tow hitch 96 may also be configured to receive a step attachment to help users step up into the housing 14.

The extendable legs 94 may include a horizontal portion 98 with a perpendicular vertical portion 100 attached at the end of the horizontal portion 98. The horizontal portion 98 and vertical portion 100 may be separated. The horizontal portion 98 may be recessed within the horizontal leg receiver and may include a vertical leg receiver 102 at one of its ends. The vertical leg receiver 102 may be configured for receiving the vertical portion 100. The vertical leg receiver 102 may be metal tube oriented perpendicular to the horizontal portion 98 and may have a larger perimeter than the vertical portion 100 of the legs. The vertical leg receiver 102 may include one or more apertures. The vertical and horizontal portions 100 and 98 may also include one or more apertures and may be a metal tube. The horizontal portions 98 may be slidably/telescopically adjusted within the horizontal leg receiver.

The legs 94 may function as a base and/or ground support for the housing 14. The legs 94 may be used to lift the housing 14 off of the trailer 12 and/or level the housing 14 with respect to the ground. The horizontal portion of the legs 98 may be adjusted away from the housing 14 to provide a wider support for the housing 14. Conversely, the legs 98 may be adjusted towards the housing 14 to provide a narrow support or make the housing 14 more compact for transport. The vertical portion of the legs 100 may be adjusted to increase the height of the housing 14 and/or lift the housing 14 off the trailer 12. Likewise, the vertical portion of the legs 100 may be adjusted to decrease the height of housing 14. The legs 100 can be locked in a variety of widths and heights. For example, when one of the apertures in the horizontal portion 98 aligns with one of the apertures in the horizontal leg receiver, a locking mechanism, e.g. a lock pin, may be inserted through the aligned apertures to lock the horizontal portion 98 in that position. Given that the horizontal portion 98 may include a plurality of apertures, then the horizontal portion 98 of the leg may be locked in a number of different widths depending on the spacing of the apertures. Likewise, the vertical portion 100 may be locked at a specific height when one of its apertures aligns with one the vertical leg receiver 102 apertures. Therefore, the vertical portion 100 may be locked at a number of different heights depending on the spacing of its apertures.

In order to stabilize the housing 14 and remove the housing 14 from the trailer 12, the user may begin by moving the tongue jack from a horizontal position to vertical position so that it may engage the ground. The user may then slide out and drop down the extendable legs 94 on the back of the housing 14 until the back legs contact the ground. The user may slide out the legs to a desired width and increase the height of the legs 94 and housing 14 by using a housing jack to jack up or raise the legs 94 and housing 14. The housing jack may engage the horizontal portion 98 of the legs 98 or the horizontal leg receiver 90 or 92. The housing jack may exert force on the horizontal portion of the legs 98 or the horizontal leg receiver 90 or 92 causing the housing 14 to raise higher above the ground. As the housing 14 raises, the vertical leg receiver 102 will slide over the vertical portion of the legs 100 recessed within the vertical leg receiver 102. Once the housing 14 is jacked to a desirable height, the user may insert a locking pin as discussed to lock the height of the housing 14. After the user has adjusted and locked the back legs 94 to a desirable height and width, the user may then raise the tongue jack until the housing is just beyond level with respect to the ground. The user may then slide out and drop down the legs 94 on the front of the housing 14 and adjust the legs 94 to a desirable height and width such that there are five points of contact among the extendable legs 94 and tongue jack. Once the legs 94 are properly adjusted and locked in place to fully support the housing 14, the user may move the tongue jack back into a horizontal position and pull the trailer 12 away from the housing 14.

The lower housing 44 may include one or more brackets 106 welded or otherwise attached to the lower housing 44. The brackets 106 may be attached to the lower front wall 60, the lower left wall 62, and/or the lower right wall 64. The brackets 106 may be configured for receiving and holding a propane tank 108. The brackets 106 may also be configured for receiving and holding one or more storage compartments, boxes, or containers (collectively, "containers 110"). The containers 110 may include a lid to cover and uncover the top of the container 110. The containers 110 may comprise any suitable container material, e.g. steel or aluminum. In various embodiments, friction-reducing members 50 may be attached to the back of the containers 110. Specifically, the friction-reducing members 50 may be attached at an angle to guide the upper housing 46 as it slides down between the brackets/containers 106/110 and the lower housing 44.

A gas line may be connected with the propane tank 108 and plumbed through the exterior of the lower housing 44 such that the gas line may be used for outdoor cooking. Specifically, the gas line may be plumbed beneath the containers 110. The gas lines may also be plumbed from the propane tank 108, through the exterior of the lower housing 44, and into the interior of the lower housing 44. Gas lines, e.g. steel gas lines, may be connected to provide gas for a stove-top, refrigerator, and the like.

One of the containers 110 may contain a battery 112. Specifically, the container 110 may contain two deep cycle batteries. Electrical wiring may be connected to the battery 112 and fed under the housing 14, e.g., the wiring may be fed beneath the composite flooring and above the outdoor plywood. The wiring from the battery 112 may be connected to an electrical distribution board 114 that divides the power into sub-circuits. The wiring from any one of the sub-circuits may be connected to lights, a refrigerator, power outlets 116, etc. The power outlets 116 may be located in any of the lower housing walls, upper housing walls, floor, countertops, cabinets, and other structures within the housing.

Figure 13A:
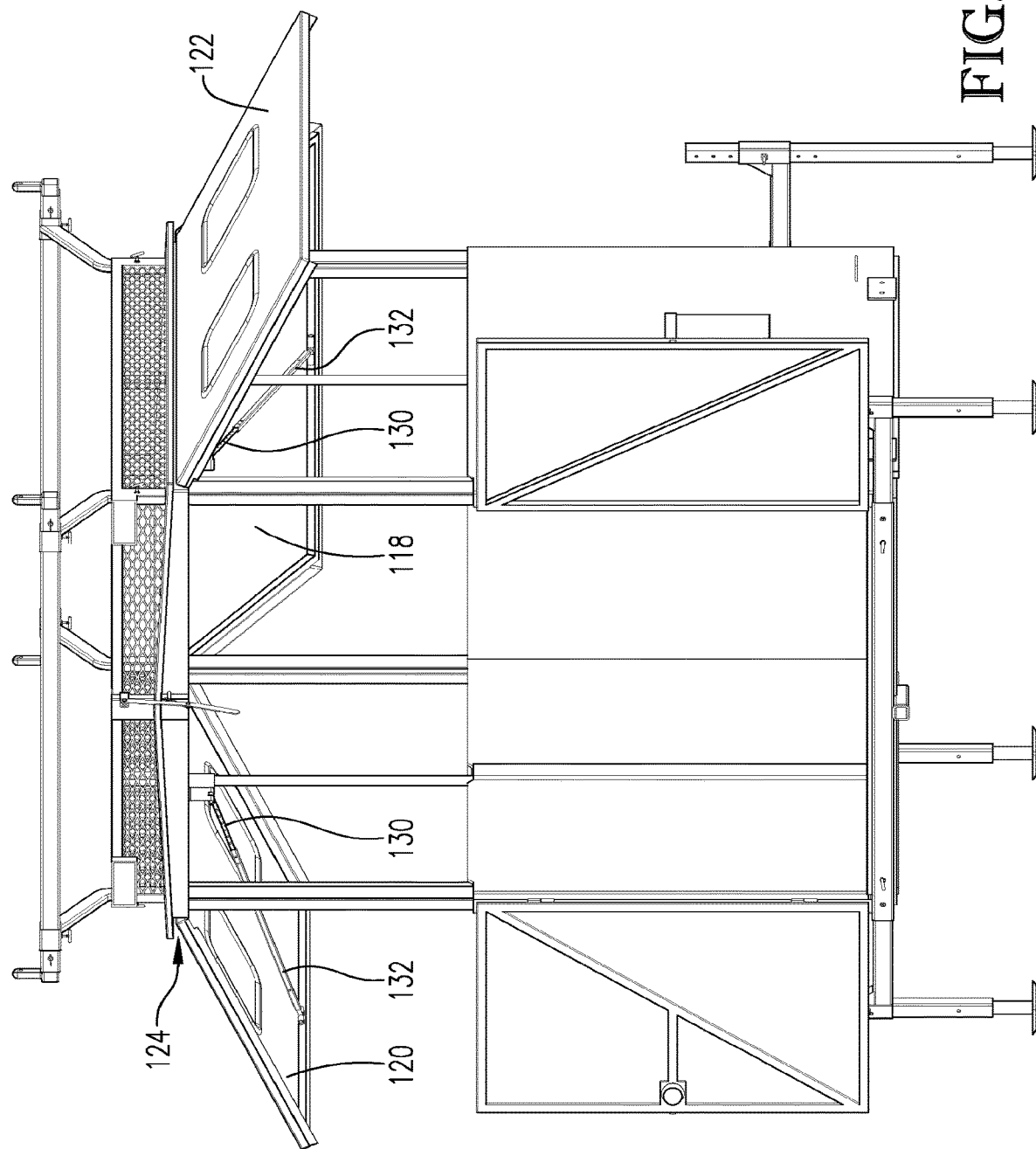
FIG. 13A is a back perspective view of the housing from FIG. 10, with upper walls extended to function as awnings.

As depicted in FIGS. 13A and 13B, the upper housing 46 may comprise a plurality of upper housing walls 118, 120, and 122 and a roof 124. In some embodiments, the upper housing 46 may comprise three walls that together define a structure similar to the lower housing 44. The upper housing 46 may include a front upper wall 118, a left upper wall 120, and a right upper wall 122. The left upper wall 120 and right upper wall 122 have a height of 42 inches and a length or width of 74¼ inches. The front upper wall 118 may have a height of 42 inches and a length or width of 63½ inches. Some embodiments may include a back upper wall. The upper walls may be hingedly attached to a bottom side of the roof 124, wherein the walls and roof together may form an opened-bottom, box-like structure. One or more of the upper walls may include one or more windows. It is foreseen that the walls may be straight, flat, and/or curved and the walls may form various shapes. The walls may comprise any suitable metal, e.g. aluminum.

In some embodiments, the upper housing walls 118, 120, and 122 may be attached or connected to a lateral arm 130, and the lateral arm 130 may be attached or connected to the roof 124. A prop plate 128 may be attached to the lateral arm 130 and roof 124 to reduce stress on the lateral arm 130. In some embodiments, the upper housing walls 118, 120, and 122 may function as retractable awnings. As depicted in FIG. 13C, the lateral arm 130 may include a plurality of apertures and may attach to a bottom portion of the upper housing wall at one end and attach to the prop plate 128 and/or roof 124 at the other end of the arm 130. The lateral arm 130 may also comprise a sleeve 132 with a plurality of apertures. The sleeve 132 may extend as the wall extends and retract as the wall retracts. The upper walls may be locked at a particular position when extended upward to function as an awning. A locking mechanism, such as a slide pin or locking pin, may be inserted through the sleeve aperture and arm aperture when the two apertures are aligned. Once the locking mechanism is inserted through the aligned apertures, it will lock the lateral arm 130 in place, which holds the position of the upper wall. The awnings (upper walls) may be locked at different angles depending on the spacing and number of apertures in the lateral arm 130 and sleeve 132.

The roof 124 may include a roof frame 134 and roof panels 136. The roof frame 134 may comprise a metal, such as iron, or more particularly heavy angle iron. In some embodiments, the roof frame 134 forms a perimeter slightly larger than the lower housing 44 and upper housing 46 such that the roof frame 134 creates a weather tight and theft proof seal when the upper housing 46 is lowered into travel mode. The roof frame 134 may also include beams extending across the upper housing 46 to provide additional roof support. The roof frame 134 may comprise various beams, tubes, and/or other frame structures. The roof panels 136 may comprise a metal, including aluminum, iron, and/or heavy angle iron. The roof panels 136 may be attached on top of the roof frame 134 such that the roof 124 entirely covers the top opening of the housing 14. The roof 124 may be sloped and may comprise an overhang to allow for proper drainage, e.g. rainwater runoff. Hanger brackets may be attached to the roof, which can be used for hanging the housing jack.

A plurality of folding gates 28 may be positioned around the perimeter of the roof 124. These gates 28 may help retain cargo stored on top of the roof 124. A plurality of brake lights may be attached to the gate 28 on the back end to alert other motorists when the vehicle and/or trailer 12 are braking.

Figure 14:
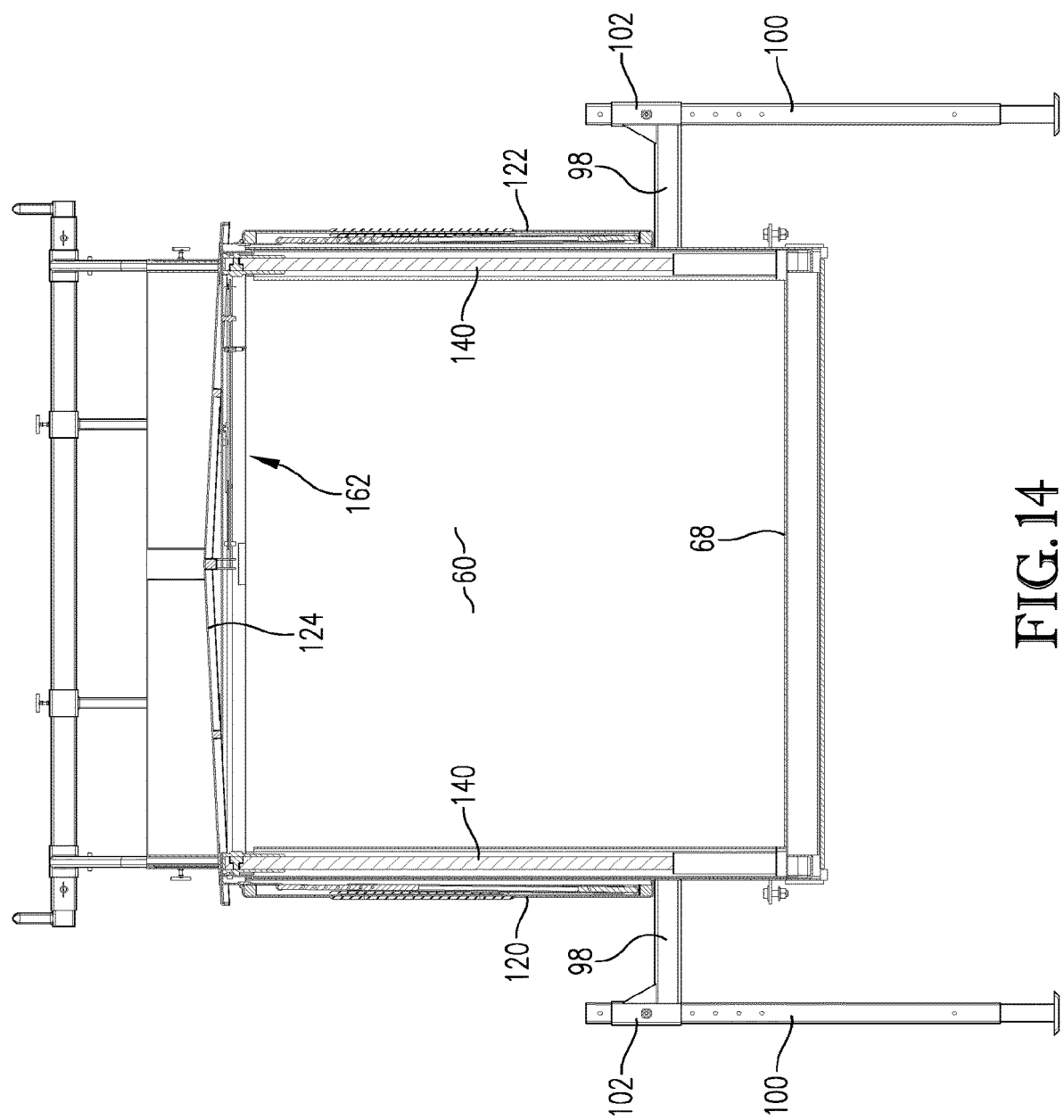
FIG. 14 is a back vertical cross section of the housing from FIG. 10, particularly illustrating hydraulic cylinders lowered, such that the housing is in a travel mode.

As depicted in FIG. 14, one of the containers 110 may contain a hydraulic system 138 configured for actuating one, two, or more hydraulic cylinders 140. In some embodiments, the hydraulic cylinders 140 are attached to the lower housing 44 at one end of the hydraulic cylinder 140 and attached to the upper housing 46 and/or roof 124 at the opposite end of the hydraulic cylinder 140. For example, a round tube may be attached to the roof 124 and hydraulic cylinders 140 to connect the two together. The hydraulic system 138 may include one or more user controls, such as buttons, switches, knobs, levers, or the like, that may control actuation of the hydraulic cylinders 140. The hydraulic system 138 may be configured to raise the roof 124 and/or upper housing 46 when the user controls are selected. Conversely, the hydraulic system 138 may be configured to lower the roof 124 and/or upper housing 46 when the user controls are selected. It is foreseen that the upper housing 46 and/or roof 124 may be raised or lowered by other mechanical and/or electrical means.

The hydraulic cylinders 140 may be housed within one of the upright support elements 70. The hydraulic cylinders may be housed within metal tubing, e.g., steel rectangular tubing. The metal tubing may be hollow on a bottom end allowing moisture to escape the tubing. An attachment mechanism, such as a steel pin, may attach the hydraulic cylinders 140 to the lower housing 44 by inserting the attachment mechanism through the lower housing walls 62 and 64, hydraulic cylinders 140, and/or metal tubing.

Figure 16:
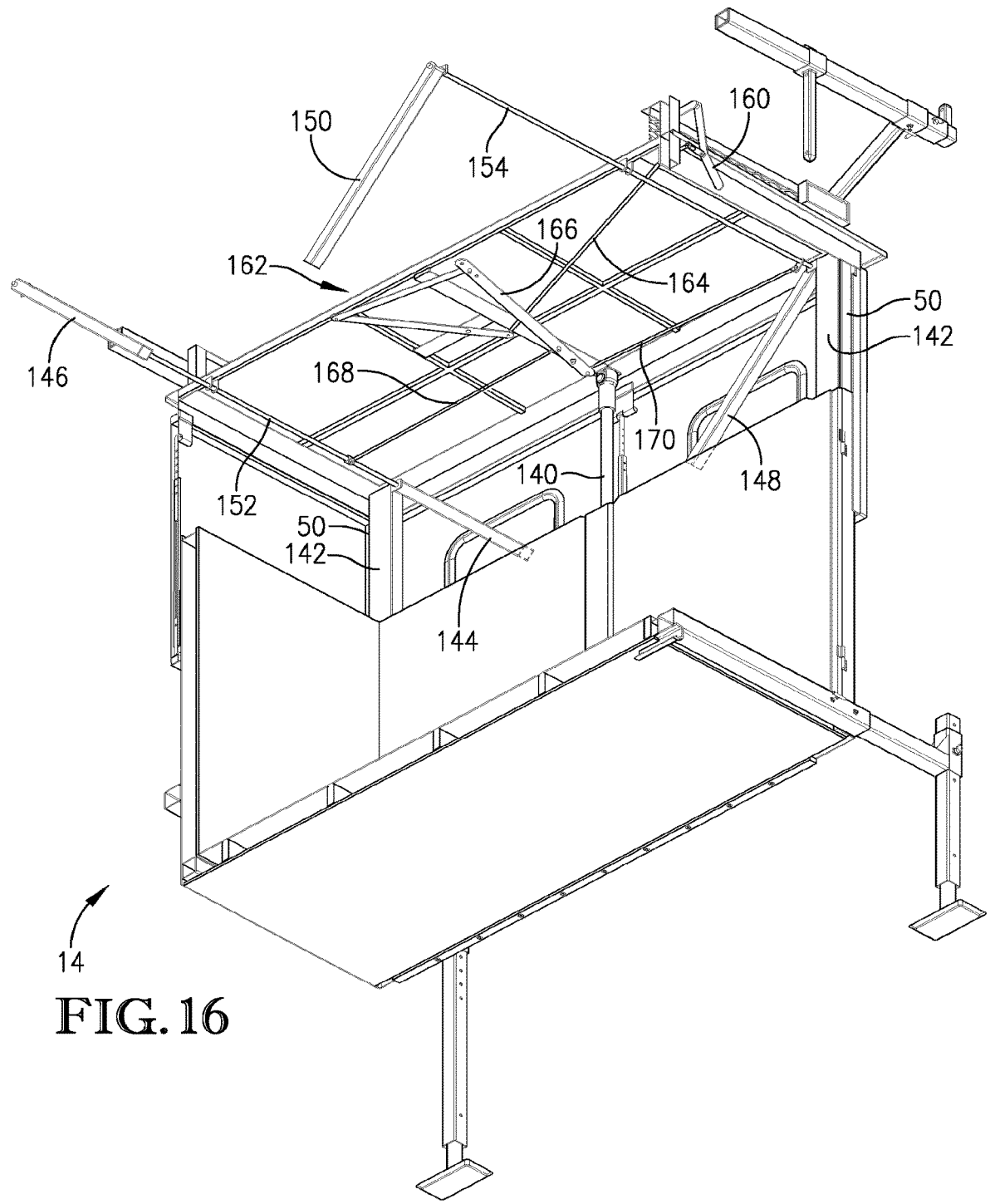
FIG. 16 is a lower isometric partial cross section view of the housing from FIG. 15, particularly illustrating the linkage system associated with the roof support structures positioned at approximately a 45 degree angle, such that the housing is being illustrated transitioning from the travel mode to a camping mode, or vice versa.
Figure 17:
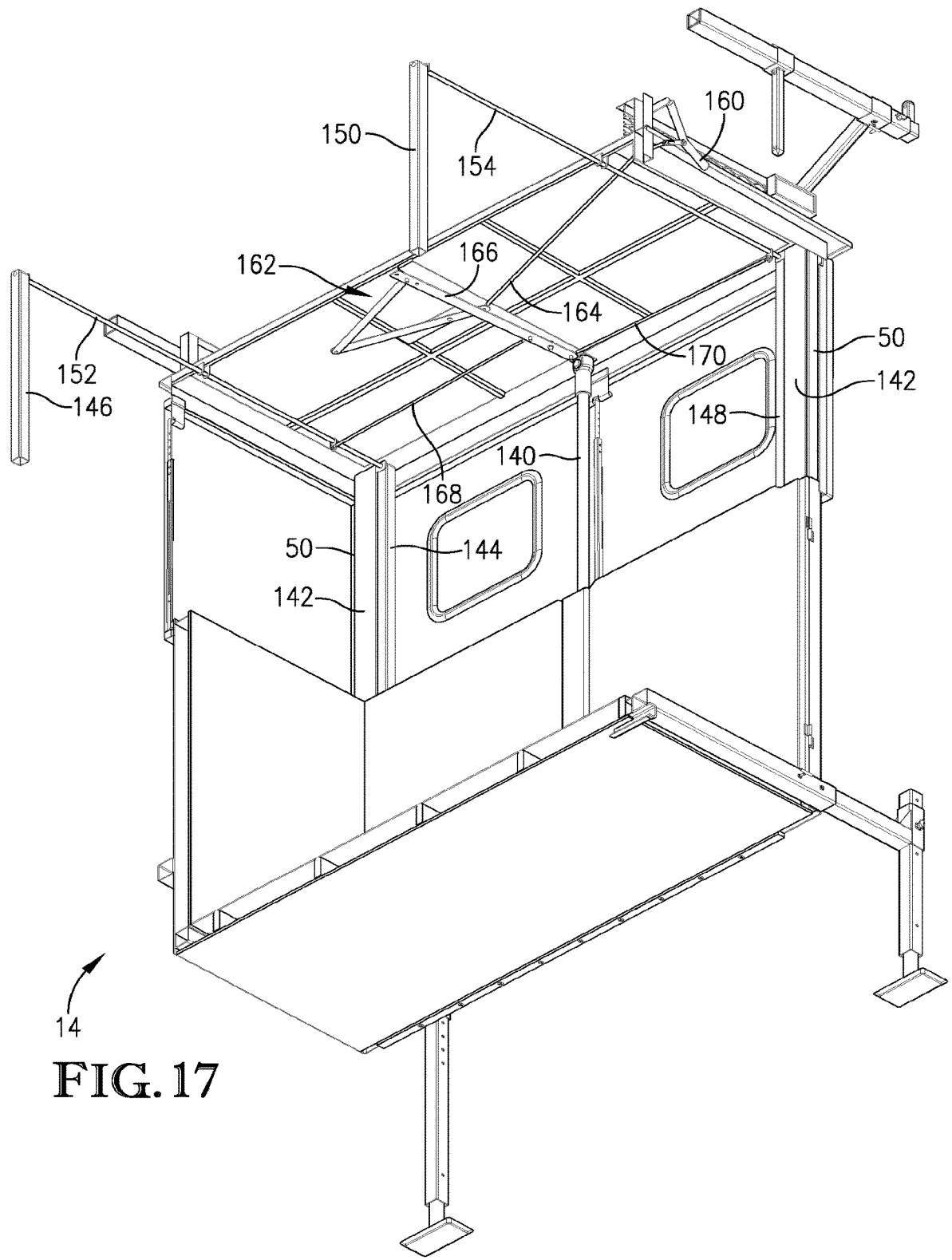
FIG. 17 is a lower isometric partial cross section view of the housing from FIGS. 15-16, particularly illustrating the linkage system associated with the roof support structures positioned in a vertical position for the camping mode.

As depicted in FIGS. 16, and 17, the upper housing 46 may include a plurality of roof stabilizing structures 142. The roof stabilizing structures 142 may comprise metal, e.g. steel or aluminum. The roof stabilizing structures 142 may also comprise beams, tubes, rods, c-channel, and/or other housing frame structures readily apparent to one of ordinary skill in the art. For example, the roof stabilizing structures 142 may comprise a steel frame construction. In embodiments having a housing with a box-like configuration, the upper housing 46 may include four roof stabilizing structures 142—one for each corner of the box. The roof stabilizing structures 142 may be attached to the roof 124 and/or upper housing 46 and the lower housing 44. In some embodiments, the roof stabilizing structures 142 may only be attached to the roof 124 and/or upper housing 46. The roof stabilizing structures 142 may be configured for balancing and stabilizing the upper housing 46 and roof 124 as the hydraulic cylinders 140 raise or lower the upper housing 46 and roof 124. The roof stabilizing structures 142 may also be configured for stabilizing the roof 124 and/or upper housing 46 when the housing 14 is stationary and the hydraulic cylinders 140 are partially or fully actuated in an elevated position. In travel mode, the roof stabilizing structures 142 may be recessed within the upright support elements 70 of the lower housing 44, but as the upper housing 46 and roof 124 are raised, the roof stabilizing structures 142 may telescopically slide out of the upright support elements 70 of the lower housing 44 in an upward direction. Likewise, the roof stabilizing structures 142 may telescopically slide down into the upright support elements 70 as the housing 14 transitions from the raised position in camping mode to the lowered position in travel mode. In order to facilitate the roof stabilizing structures 142 telescopically sliding in the upright support elements 70, friction-reducing members 50 may be releasably fixed to the roof stabilizing structures 142. For example, the friction-reducing members 50 may be releasably fixed to the roof stabilizing structures 142 by countersunk screws. These friction-reducing members 50 may reduce the friction between the roof stabilizing structures 142 and upright support elements 70 as the roof stabilizing structures 142 telescopically slide in and out of the upright support elements 70.

Figure 15:
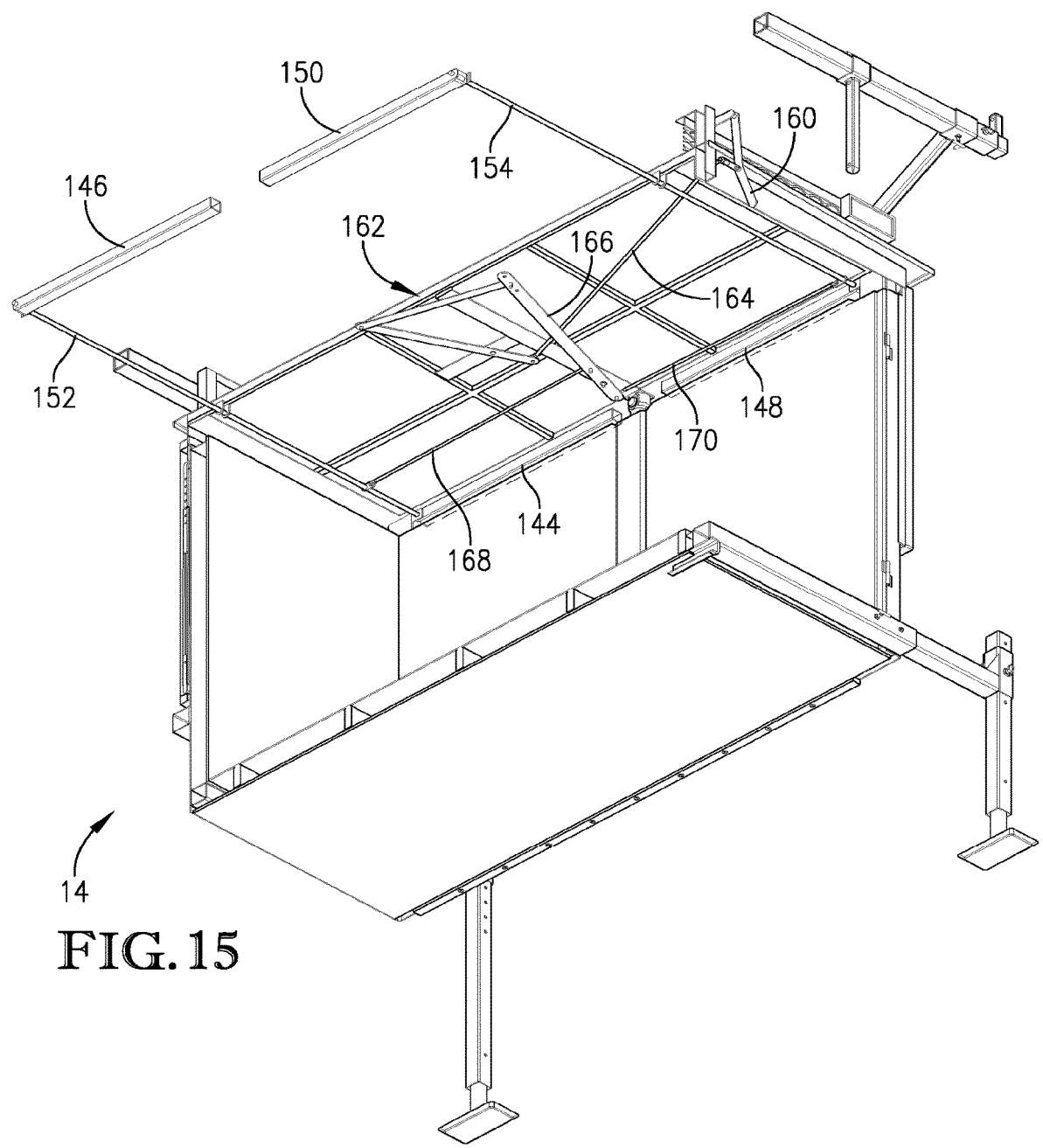
FIG. 15 is a lower isometric partial cross section view of the housing from FIG. 4A, particularly illustrating a linkage system associated with roof support structures positioned in a horizontal position for travel mode.

As depicted in FIGS. 15-17, a plurality of roof support structures may be hingedly attached to the roof 124 and/or upper housing 46 at one end and unattached at the opposite end of the roof support structure. The roof support structures may comprise metal, e.g. steel or aluminum. The roof support structures may also comprise beams, tubes, c-channel, and/or other housing frame structures readily apparent to one of ordinary skill in the art. For example, the roof support structures may comprise a steel frame construction.

In some embodiments, the roof support structures are in a support configuration in which they are configured to support the upper housing 46 in the raised position. The roof support structures may be shiftable in and out of the support configuration and may be configured to be shifted to the support configuration when the upper housing 46 is shifted from the lowered position to the raised position. The roof support structures may be hingedly attached to an interior of the upper housing 46 and may be configured to rotate in and out of the support configuration. The operation for shifting the roof support structures in and out of the support configuration will be described in more detail below.

In box-like housing embodiments, a roof support structure may be hingedly attached near each corner of the roof 124 for a total of four roof support structures: a front right support 144, front left support 146, back right support 148, and a back left support 150. A front connecting member 152, e.g. an axle-like rod, may connect the front right support 144 to the front left support 146 such that when the connecting member 152 rotates, then the associated roof support structures 144 and 146 may correspondingly rotate together. Likewise, a back connecting member 154 may connect the back left support structure 150 to the back right support structure 148 and function in a similar manner. When the upper housing 46 is lowered in travel mode, the roof support structures 144, 146, 148, and 150 may lie on top of and substantially parallel to the top left and right lower housing support elements 78 and 80. As illustrated in FIG. 15, the front right roof support structure 144 and back right roof support structure 148 may lie on top of and substantially parallel to the right top lower housing element 80. Likewise, the front left roof support structure 146 and back left roof support structure 150 may lie on top of and substantially parallel to the top left lower housing support element 78. In these positions, the roof support structures are not configured to support the upper housing 46 when the upper housing 46 is in the lowered position (See FIG. 15). When the roof support structures are lying flat on the top left and right lower housing elements, the unattached end of the roof support structure may lie near the hydraulic cylinder 140 and/or the upright support element 70 housing the hydraulic cylinder 140. Assuming the roof support structures are horizontal when they are parallel to the top left and right lower housing support elements 78 and 80, then angle of the roof support structures may gradually change (See FIG. 16) as the roof support structures are actuated until they reach a vertical position (See FIG. 17). Furthermore, the unattached end gradually slides away from the hydraulic cylinder 140 and continues sliding away until it reaches an indentation or notch 158 in the top lower housing element 78 and/or 80 located near a corner of the housing. Thus, the notches 158 may be engaging the roof support structures when in the support configuration.

The roof support structures may automatically move/rotate to support the upper housing 46 and engage the notches 158 in their respective corners of the housing 14. The roof support structures may automatically support the upper housing 46 because as the upper housing 46 is being raised, the force exerted on the upper housing 46 affects the attached end and the force of gravity pushing down on the unattached end may cause the unattached end to gradually slide towards the notch 158 until the roof support structure is oriented in a vertical position, oriented substantially parallel to the force of gravity, oriented parallel to the upper housing walls, and/or oriented perpendicular to the top lower housing support elements 78 and 80.

The indentation or notch 158 may be located near the roof stabilizing structures 142 in each of the four corners of the housing 14. The top lower housing elements 78 and 80 may also include additional indentations or notches 158 between the hydraulic cylinder 140 and the indentations or notches 158 located in the corners of the housing 14. In the event that one or more of the roof support structures 144, 146, 148, and/or 150 fail or slip out of place, these additional indentations or notches 158 may snag the roof support structure to prevent the roof support structures from sliding/rotating any further, which may also prevent the upper housing 46 and/or roof 124 from falling any further.

The user may facilitate the process of rotating the roof support structures by actuating an actuator comprising a safety lever 160 that operates a linkage system 162 that may push or pull the roof support structures as described above. Once the unattached end of the roof support structure is settled in the notch 158, then the roof support structure may support the roof 124 and upper housing 46 in its upright position, e.g. camping mode. The roof support structures may support the roof 124 and upper housing 46 independently of the hydraulic cylinders 140, which could be helpful in the event that the hydraulic system 138 fails. The lever 160 may also be configured to disengage the roof support structures from the support configuration to permit lowering of the upper housing 46.

In order to lower the upper housing 46 from camping mode to travel mode, the user may actuate the safety lever 160 causing the linkage system 162 to pull the roof support structures such that the unattached ends move away from their respective notches 158 and towards the hydraulic cylinder 140. The roof support structures may continue moving toward the hydraulic cylinder 140 until they are substantially parallel to and lying flat on the top left and right lower housing elements 78 and 80. Thus, the user may move the roof support structures to lower the roof 124 and upper housing 46 while standing outside the housing 14. If the user went inside the housing 14 to manually move the roof support structures to lower the roof 124 and upper housing 46, then the user would be at risk of the roof 124 falling on top of him/her. Since the safety lever 160 may be located near an outer perimeter of the housing 14, then the user may safely stand outside the housing 14 and manipulate the lever 160 to move the roof support structures and lower the housing 14 while he/she stands safely outside.

The safety lever 160 may be attached to the upper housing 46 or roof 124. Specifically, one end of the safety lever 160 may be attached to a portion of the roof 124 or upper housing 46 located above the doors 66 on the back of the housing. The other end of the lever 160 may be unattached and hang in the middle of the doorway. The lever 160 may extend downward from the roof 124 toward the floor 68 such that the lever 160 is substantially parallel to the doors 66. In some embodiments, when the lever 160 is gradually actuated upward until the lever 160 is substantially perpendicular to the doors 66, then it may cause the linkage system 162 to push the roof support structures towards and eventually into an upright position. Thus, the safety lever 160 is pushed up and out of the doorway when the housing is transitioned to camping mode and the unattached ends of the roof support structures are in their respective notches 158. Conversely, the safety lever 160 may be gradually actuated downward until the lever 160 is substantially parallel with the doors 66, which may cause the linkage system 162 to pull the roof support structures towards and eventually into a flat position as previously described. Thus, in travel mode, the safety lever 160 may be compact with the trailer and housing system to increase aerodynamics.

The safety lever 160 may be connected to the linkage system 162, the linkage system 162 may be connected to front and back connecting members 152 and 154, and the connecting members 152 and 154 may be connected to the roof support structures. The linkage system 162 may comprise a plurality of connected links. Specifically, the linkage system may comprise six links. The links may be metal rods, bars, or the like. A lever link 164 may be connected to the lever at one end and a series of links at the other end. The series of links may be connected to a main link 166, and the main link 166 may be connected to a front link 168 and a back link 170. The front link 168 may be connected to the front connecting member 152 and the back link 170 may be connected to the back connecting member 154.

In some embodiments, the linkage system 162 may operate in the following manner to actuate the roof support structures. When the safety lever 160 is actuated upward, then the lever link 164 is pulled back toward the lever 160. When the lever link 164 is pulled back toward the lever 160, the series of links cause the main link 166 to push the front link 168 and back link 170 away from the main link 166. When the front link 168 and back link 170 are pushed away from the main link 166, the front link 168 and back link 170 cause the corresponding connecting member 152 and/or 154 to rotate such that the connected roof support structures correspondingly rotate to the upright position. Conversely, when the safety lever 160 is actuated downward, then the lever link 164 is pushed away from the lever 160. When the lever link 164 pushed away from the lever 160, the series of links cause the main link 166 to pull the front link 168 and back link 170 toward the main link 166. When the front link 168 and back link 170 are pulled toward the main link 166, the front link 168 and back link 168 cause the corresponding connecting members 152 and 154 to rotate such that the connected roof support structures rotate to a horizontal position that is substantially parallel to the top left and right lower housing support elements 78 and 80.

Turning to FIGS. 18-25, some embodiments may include a cargo rack 172 attached on top of the roof 124. The cargo rack 172 may comprise metal tubing, and more specifically, the cargo rack 172 may comprise steel tubing and c-channel. The cargo rack 172 may be galvanized for enhanced durability. The cargo rack 172 may include removable main cargo legs 174 and adjustable secondary cargo supports 176. The main cargo legs 174 may include a first portion 178 and a second portion 180 such that the second portion 180 extends away from the first portion 178 at about a 45 degree angle. The main leg 174 may also include a secondary cargo support receiver 182 located at the end of second portion 180 and may be configured for receiving the secondary cargo support 176.

A main cargo leg receiver 184 may be a rectangular metal tube and may be positioned near each of the four corners of the roof 124. For example, there may be front right cargo leg receiver, a front left cargo leg receiver, a back right cargo leg receiver, and a back left cargo leg receiver. The first portion 178 of the main cargo legs 174 may be inserted into the cargo leg receivers 184. The main cargo legs 174 may be inserted in at least two positions. In a forward position, the main cargo legs 174 may be inserted in the cargo leg receivers such that the second portion 180 of the legs 174 extend in a direction from back to front. In a rearward position, the main cargo legs 174 may be inserted in the cargo leg receivers 184 such that the second portion 180 of the legs 174 extend in a direction from front to back.

The secondary cargo supports 176 may be inserted into the secondary cargo receivers 182. For example, a cargo rack 172 may include two secondary cargo supports 176: a front secondary cargo support may be inserted through the front left cargo support receiver and the front right cargo support receiver. Likewise, a back secondary cargo support may be inserted through the back left cargo receiver and the back right cargo receiver. The secondary cargo supports 176 and secondary cargo support receivers 182 may be positioned such that the secondary cargo supports 176 are parallel to the front and back walls and perpendicular to the side walls.

Figure 18:
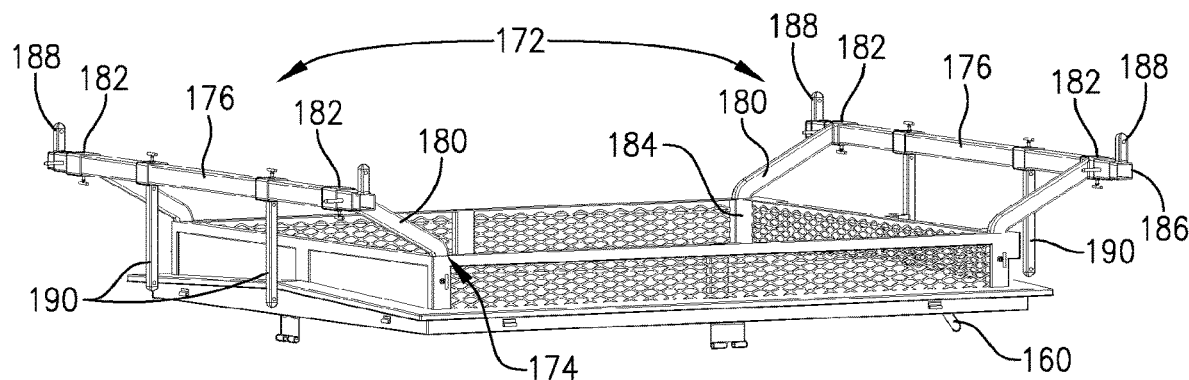
FIG. 18 is a front left perspective view of cargo legs of the housing shown in FIG. 3, with front cargo legs shown in a forward position and back cargo legs shown in a rearward position.
Figure 19:
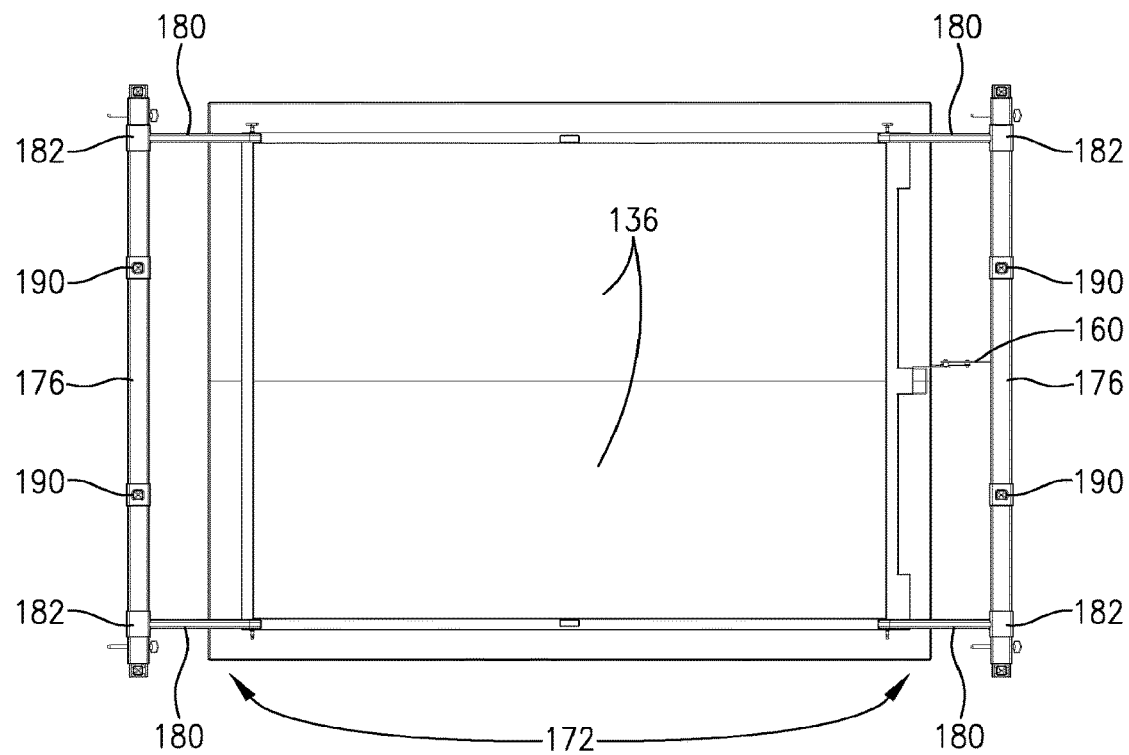
FIG. 19 is a top plan view of the cargo from FIG. 18.
Figure 20:
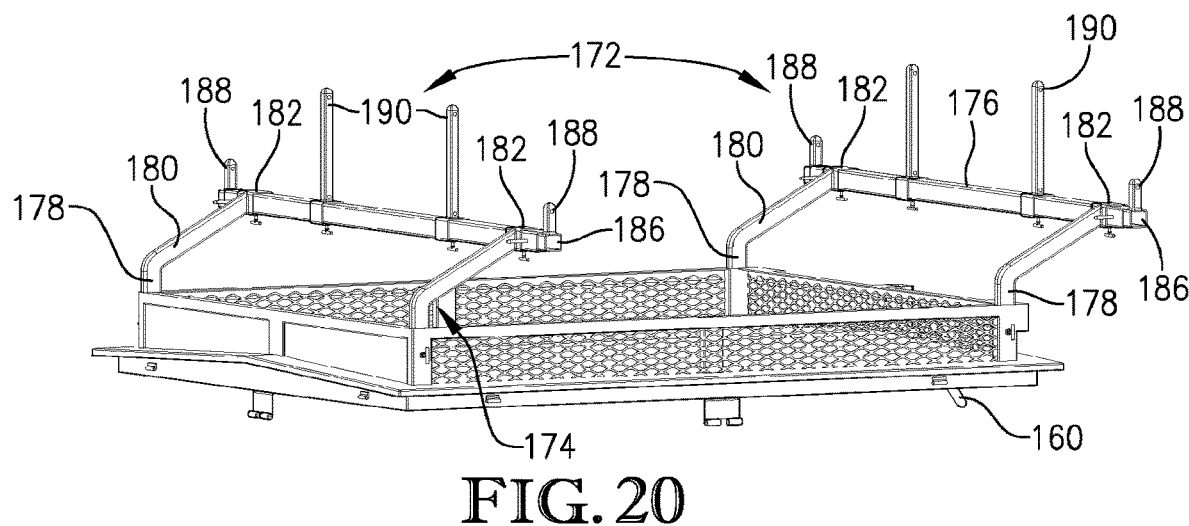
FIG. 20 is a front left perspective view of the cargo legs from FIGS. 18-19, particularly illustrating the front cargo legs in a rearward position and the back cargo legs in a rearward position.
Figure 21:
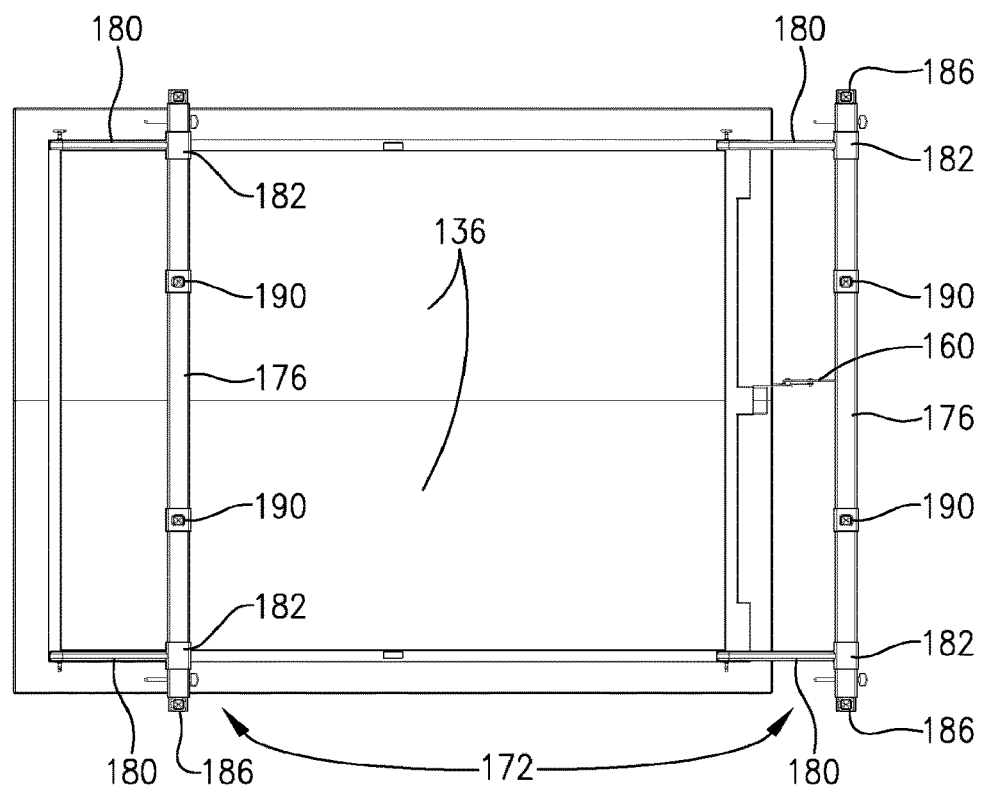
FIG. 21 is a top plan view of the cargo legs from FIG. 20.
Figure 22:
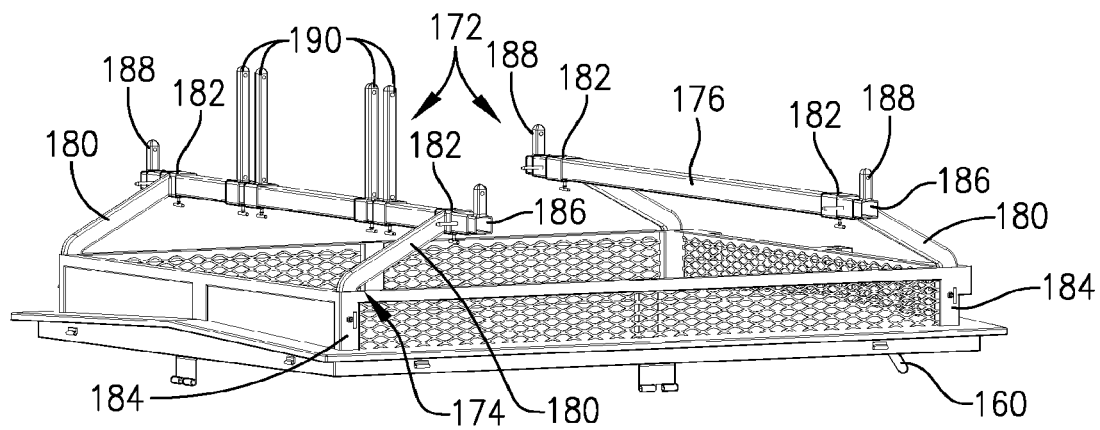
FIG. 22 is a front left perspective view of the cargo legs from FIGS. 18-21, particularly illustrating the front cargo legs in a rearward position and the back cargo legs in a forward position.
Figure 23:
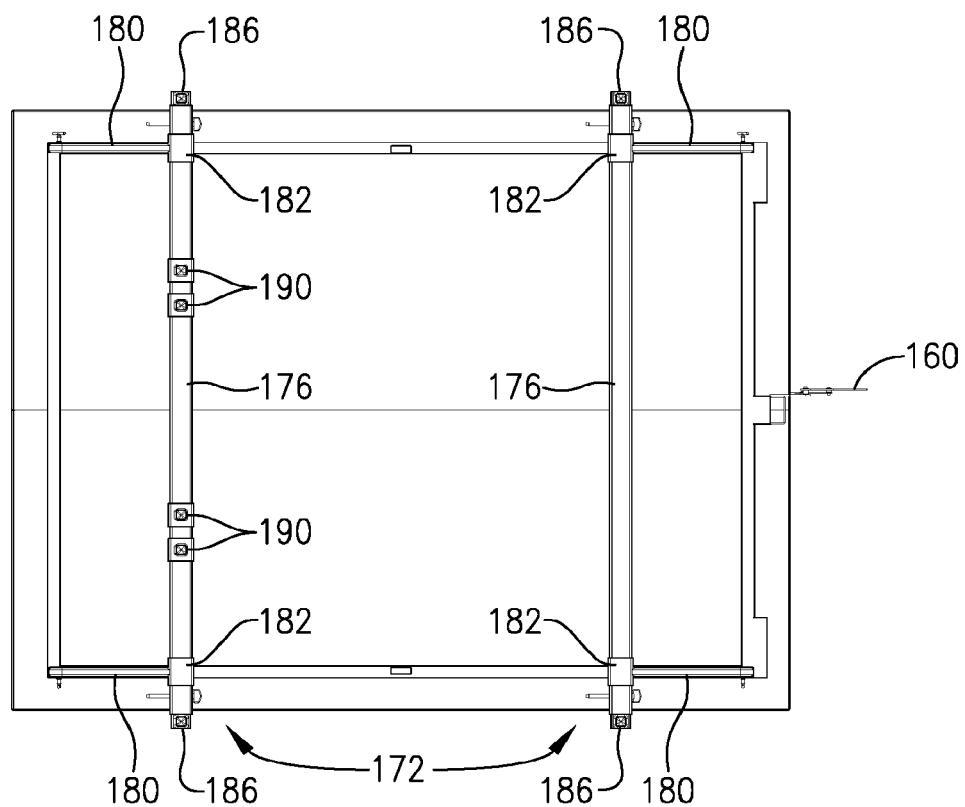
FIG. 23 is a top plan view of the cargo legs from FIG. 22.

The main cargo legs 174 may be removable in order to adjust the length of the cargo rack 172. The length of the cargo rack 172 is the distance from the front secondary cargo support to the back secondary cargo support. In some embodiments, the cargo rack 172 may be adjusted to three different lengths: a first length, a second length, and a third length. For example, a first cargo rack length may be about eight feet, a second length may be six feet, and a third length may be four feet. In order to adjust the cargo rack 172 for the first length as illustrated in FIG. 18, the front main cargo legs may be positioned in the forward position and the back main cargo legs may be positioned in the rearward position. For the second length, the front and back main cargo legs may be in a forward position, or the front and back main cargo legs may be in a rearward position as illustrated by FIG. 20. For the third length as illustrated by FIG. 22, the front main cargo legs may be in a rearward position and the back main cargo legs may be in a forward position.

The secondary cargo supports 176 may comprise open-ended metal tubing and may also include a plurality of apertures therein. A cargo extension 186 may be recessed within the secondary cargo support 176 and may also include a plurality of apertures therein. The cargo extension 186 may be inserted into each open end of the secondary cargo support 176. For example, a front right cargo extension may be inserted into a front right open end, a front left cargo extension may be inserted into a front left open end, a back left cargo extension may be inserted into a back left end, and a back right cargo extension may be inserted into a back right end. The cargo extension 186 may include a lip 188 protruding upward from an end of the secondary cargo support 176. The lip 188 may help keep cargo contained on the cargo rack 172. The secondary cargo supports 176 may be held in place by a locking mechanism, e.g. a set bolt, inserted through an aperture in the secondary cargo receiver 182 and the secondary cargo support 176.

Figure 24:
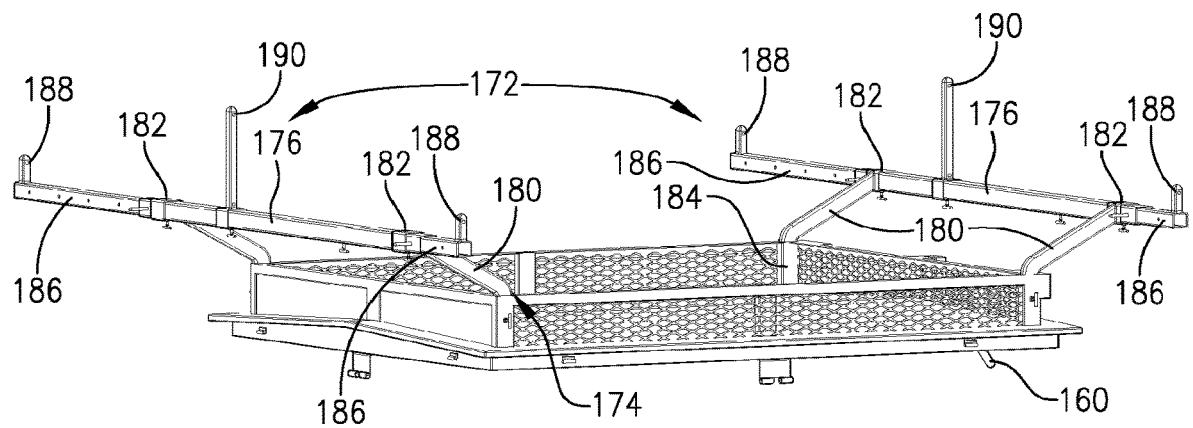
FIG. 24 is a front left perspective view of the cargo legs from FIG. 18-23, particularly illustrating cargo extensions being extended.
Figure 25:
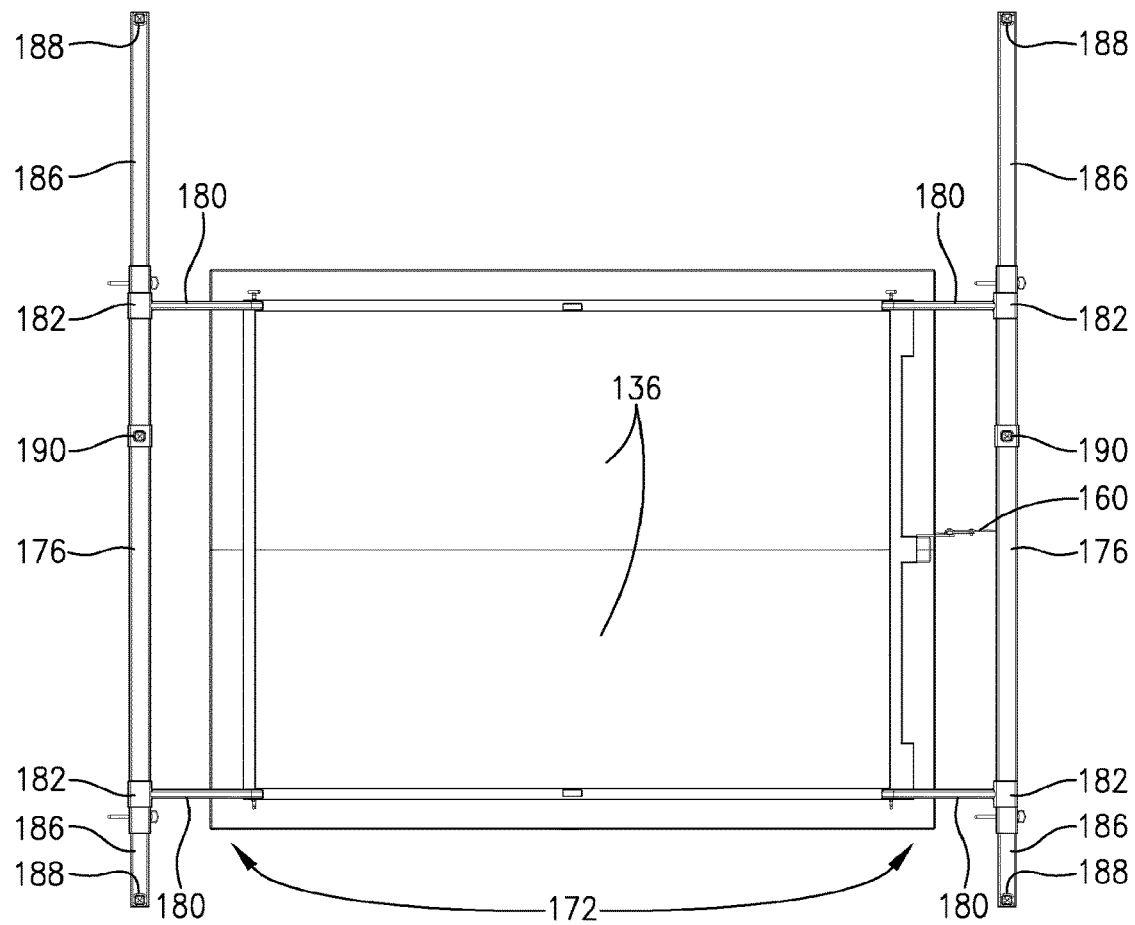
FIG. 25 is a top plan view of the cargo legs from FIG. 24.

The cargo rack 172 width may be adjusted by sliding the cargo extensions 186 inward or outward, toward or away from the housing 14 respectively, as illustrated in FIGS. 24 and 25. The cargo rack 172 may comprise a front width and a back width. The front width may be the distance between the lip 188 on the front left cargo extension 186 and the lip 188 on the front right cargo extension 186. Likewise, the back width may be the distance between the lip 188 on the back left cargo extension 186 and the lip 188 on the back right cargo extension 186. The front and back widths may comprise a standard width, a number of intermediate widths, and maximum width. For example, the standard width, e.g. when the extensions 186 are fully retracted, may be about 68 inches. The maximum width, e.g. when the extensions 186 are fully extended, may be about 122 inches because each extension 186 may extend up to 27 inches on each side. The cargo rack 172 may comprise a plurality of intermediate widths between the standard width and maximum width. The intermediate widths may be any width between the standard and maximum widths. The cargo rack 172 may be locked at any width by inserting a locking mechanism, e.g. a set pin, through an aperture in the secondary cargo support 176 and through a corresponding aperture in the cargo extension 186.

Load dividers 190 may be inserted through the secondary cargo support 176 to provide additional structure for strapping down cargo and/or separating cargo. As illustrated in FIGS. 20, 22, and 24, the load dividers 190 may be used to separate and secure two kayaks. The load dividers 190 may include an elongated metal divider and a set bolt for locking the divider 190 in place. When the cargo racks 172 are being used for travel or the housing 14 is in camping mode, the load dividers 190 may be inserted such that the divider 190 protrudes upward through the secondary cargo support 176. When the cargo racks 172 are not being used and the housing 14 is in travel mode, the load dividers 190 may be inserted such that the metal extensions protrude downward through the secondary cargo support 176.

It is foreseen that any element, part, and/or component associated with the lower housing 44 may instead be associated with the upper housing 46 and vice-versa. It is also foreseen that any element, part, and/or component associated with an exterior part of the housing 14 may instead be associated with an interior part of the housing 14 and vice versa. It is further foreseen that any element, part, and/or component that is associated with a particular wall may alternatively be associated with any of the other walls.

A method for securing and adjusting the housing 14 on the trailer 12 will now be described. The steps of the method may be performed in the order as described, or they may be performed in a different order. Furthermore, some steps may be performed concurrently as opposed to sequentially. In addition, some steps may not be performed. The housing 14 may be positioned above the trailer 12 such that the tabs 54 of the housing 14, the friction-reducing members 50, and the slots 48 of the trailer 12 are vertically aligned. The housing 14 may then be placed on the friction-reducing members 50 and/or the trailer 12. Once the housing 14 is on the friction-reducing members 50, the housing 14 may be adjusted with respect to the trailer 12 such that the housing 14 and the friction reducing members 50 are configured to slide forward toward the front end 18 of the frame 16 and slide back towards the back end 20 of the frame 16. The housing 14 may be secured to the friction-reducing members 50 and trailer 12 by fastening a fastener, e.g. a bolt, through the aperture 56 of the tab 54, through the aperture 52 of the friction reducing members 50 and through the slot 48 of the trailer 12. The concept of sliding the housing 14 on the trailer 12 provides a number of benefits which include distributing the weight of the housing 14 on the trailer 12, stabilizing the housing 14 on the trailer 12, and/or creating more room for other goods or housing components near the front end 18 or back end 20 of the trailer 12.

Although the invention has been described with reference to the preferred embodiment(s), it is noted that equivalents may be employed and substitutions made herein without departing from the scope of the invention. Thus, the invention described herein is entitled to those equivalents and substitutions that perform substantially the same function in substantially the same way.

Having thus described various embodiments of the invention, what is claimed as new and desired to be protected by Letters Patent includes the following:

What is claimed is:

1. A transportable housing system comprising:
   a lower housing comprising an upright support element;
   an upper housing vertically shiftable relative to said lower housing between a lowered position and a raised position, said upper housing comprising a support structure, wherein said upright support element of said lower housing guides said support structure of said upper housing as said upper housing shifts relative to said lower housing,
   a lifting device comprising a cylinder at least partially housed in said upright support element of said lower housing and configured to shift said upper housing relative to said lower housing.

2. The system according to claim 1, wherein said support structure of said upper housing is configured to support said upper housing in said raised position.

3. The system according to claim 1, further comprising a friction-reducing member positioned between said upright support structure of said lower housing and said support structure of said upper housing.

4. The system according to claim 1, wherein said upper housing comprises a plurality of walls and a roof, wherein at least one wall is hingedly attached to said roof so that said at least one wall can be positioned at different angles relative to said roof.

5. The system according to claim 4, further comprising a support arm extending from said roof and configured to hold a position of said at least one wall with respect to said roof.

6. The system according to claim 5, further comprising a plate extending down from said roof, wherein said support arm is attached to said plate and said at least one wall.

7. The system according to claim 6, wherein said support arm is extendable and retractable to hold said at least one wall at a plurality of positions with different angles relative to said roof.

8. The system according to claim 7, further comprising a sleeve operable to receive at least a portion of said support arm.

9. The system according to claim 8, wherein said support arm includes an arm aperture and said sleeve includes a sleeve aperture, further comprising a locking mechanism operable to be inserted through said sleeve aperture and said arm aperture.

10. The system according to claim 1, wherein said lower housing includes a utility hook-up and said upper housing includes a plurality of walls, and at least one of said walls covers said utility hook-up when said upper housing is in said lowered position.

11. The system according to claim 10, wherein said utility hook-up comprises a water port.

12. The system according to claim 1, further comprising—
   one or more bracket extending outwardly from said lower housing;
   a container attachable to said bracket; and
   a friction-reducing member attached to a back side of said container and positioned at an angle relative to said back side to guide a portion of said upper housing as it slides down between said container and said lower housing.

13. A transportable housing system comprising:
   a lower housing comprising a plurality of hollow upright support structures;
   an upper housing vertically shiftable relative to said lower housing between a lowered position and a raised position and comprising a plurality of stabilizing structures configured to be recessed inside said hollow upright support structures when said upper housing is in said lowered position; and
   a lifting device comprising a cylinder at least partially housed in said upright support element of said lower housing and configured to shift said upper housing relative to said lower housing.

14. The system according to claim 13, further comprising one or more friction reducing member positioned between said hollow upright support structures and said stabilizing structures.

15. The system according to claim 13, wherein said upper housing comprises a roof and a plurality of walls, at least one of said walls being hingedly attached to said roof so that said at least one wall can be positioned at different angles relative to said roof.

16. A transportable housing system comprising:
   a lower housing comprising an upright support element;
   an upper housing vertically shiftable relative to said lower housing between a lowered position and a raised position and comprising—
      a roof,
      a roof stabilizing structure attached to said roof and engaged with said upright support element so that said upright support element guides said roof stabilizing structure when said upper housing shifts relative to said lower housing,
      a roof support structure attached to said roof and configured to support said upper housing in said raised position; and
   a lift device comprising a cylinder at least partially housed in said upright support element of said lower housing and configured to shift said upper housing relative to said lower housing.

17. The system according to claim 16, wherein said upper housing includes—
   one or more walls hingedly attached to said roof so that each of said walls can be positioned at different angles relative to said roof, one or more plates extending down from said roof, and
a support arm attached to one of said walls and extending to one of said plates and configured to hold a position of its respective wall with respect to said roof.

* * * * *